United States Patent

Sugaya et al.

(10) Patent No.: US 12,324,001 B2
(45) Date of Patent: Jun. 3, 2025

(54) WIRELESS COMMUNICATION APPARATUS AND WIRELESS COMMUNICATION METHOD

(71) Applicant: Sony Group Corporation, Tokyo (JP)

(72) Inventors: Shigeru Sugaya, Tokyo (JP); Yuichi Morioka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/429,493

(22) Filed: Feb. 1, 2024

(65) Prior Publication Data

US 2024/0244642 A1   Jul. 18, 2024

Related U.S. Application Data

(63) Continuation of application No. 17/267,035, filed as application No. PCT/JP2019/025062 on Jun. 25, 2019, now Pat. No. 11,930,511.

(30) Foreign Application Priority Data

Aug. 16, 2018 (JP) ................................. 2018-153176

(51) Int. Cl.
*H04W 72/29* (2023.01)
*H04W 72/0453* (2023.01)
*H04W 84/12* (2009.01)

(52) U.S. Cl.
CPC ....... *H04W 72/29* (2023.01); *H04W 72/0453* (2013.01); *H04W 84/12* (2013.01)

(58) Field of Classification Search
CPC . H04W 72/29; H04W 72/0453; H04W 84/12; H04W 16/10; H04W 72/20;
(Continued)

(56) References Cited

U.S. PATENT DOCUMENTS

| 9,326,153 | B2 | 4/2016 | Abraham et al. |
| 2012/0176974 | A1* | 7/2012 | Abraham ............... H04W 16/14 370/329 |

(Continued)

FOREIGN PATENT DOCUMENTS

| CA | 2784993 A1 * | 10/2011 | ............ H04W 40/02 |
| CN | 101212380 A | 7/2008 | |

(Continued)

OTHER PUBLICATIONS

International Search Report and Written Opinion mailed on Sep. 10, 2019, received for PCT Application PCT/JP2019/025062, Filed on Jun. 25, 2019, 10 pages.

(Continued)

*Primary Examiner* — Ayaz R Sheikh
*Assistant Examiner* — Louis Samara
(74) *Attorney, Agent, or Firm* — XSENSUS LLP

(57) ABSTRACT

There is provided a wireless communication apparatus serving as an access point of a wireless LAN. The wireless communication apparatus includes a wireless communication unit and a controller. The wireless communication unit receives a signal including information regarding a channel used in an OBSS (Overlap Basic Service Set). The controller determines a frequency band of a channel used in a BSS (Basic Service Set) on the basis of the information regarding the channel used in the OBSS.

19 Claims, 20 Drawing Sheets

(58) Field of Classification Search
CPC ... H04W 72/56; H04W 52/367; H04W 24/08; H04J 11/005
See application file for complete search history.

(56) References Cited

U.S. PATENT DOCUMENTS

| | | | | |
|---|---|---|---|---|
| 2014/0328264 | A1* | 11/2014 | Merlin | H04W 16/10 370/329 |
| 2015/0289142 | A1* | 10/2015 | Abeysekera | H04W 72/0453 370/338 |
| 2016/0014725 | A1 | 1/2016 | Yu et al. | |
| 2016/0323853 | A1* | 11/2016 | Kim | H04W 72/12 |
| 2017/0026970 | A1* | 1/2017 | Pack | H04W 48/18 |
| 2017/0303201 | A1* | 10/2017 | Park | H04W 28/065 |
| 2017/0310506 | A1* | 10/2017 | Park | H04L 27/34 |
| 2018/0027573 | A1* | 1/2018 | Cariou | H04W 52/367 370/329 |
| 2018/0098336 | A1* | 4/2018 | Alpert | H04W 16/10 |
| 2021/0243628 | A1* | 8/2021 | Oteri | H04W 84/12 |
| 2021/0258806 | A1* | 8/2021 | Stacey | H04W 72/0453 |
| 2024/0147274 | A1* | 5/2024 | Oteri | H04W 24/08 |

FOREIGN PATENT DOCUMENTS

| | | | |
|---|---|---|---|
| CN | 103828262 | A | 5/2014 |
| CN | 106797662 | A | 5/2017 |
| CN | 107006038 | A | 8/2017 |
| CN | 107710859 | A | 2/2018 |
| CN | 108141889 | A | 6/2018 |
| EP | 3518571 | A1 | 7/2019 |
| JP | 2013-534118 | A | 8/2013 |
| JP | 2016-524368 | A | 8/2016 |
| JP | 2017-505082 | A | 2/2017 |
| JP | 2017224948 | A * | 12/2017 |
| KR | 20140083502 | A | 7/2014 |
| KR | 20150038208 | A | 4/2015 |
| KR | 20150117655 | A | 10/2015 |
| KR | 20160003118 | A | 1/2016 |
| KR | 20160004950 | A | 1/2016 |
| KR | 20160010431 | A | 1/2016 |
| WO | 2014/179608 | A1 | 11/2014 |
| WO | 2018/055901 | A1 | 3/2018 |

OTHER PUBLICATIONS

Oteri Oghenekome et al., "Advanced power control techniques for interference mitigation in dense 802.11 networks", 2013 16th International Syposium on Wireless Personal Multimedia Communication (WPMC) NICT, Jun. 24, 2013 (Jun. 24, 2013), pp. 1-7. XP032493927, ISSN: 1347-6890 [retreived on Oct. 2, 2013].

* cited by examiner

FIG. 7

| \multicolumn{8}{c|}{Channel Usage Map(20MHz)} |
|---|---|---|---|---|---|---|---|
| 0 | 4 | 16 | 68 | 32 | 132 | 48 | 196 |
| 1 | 8 | 17 | 72 | 33 | 136 | 49 | 200 |
| 2 | 12 | 18 | 76 | 34 | 140 | 50 | 204 |
| 3 | 16 | 19 | 80 | 35 | 144 | 51 | 208 |
| 4 | 20 | 20 | 84 | 36 | 148 | 52 | 212 |
| 5 | 24 | 21 | 88 | 37 | 152 | 53 | 216 |
| 6 | 28 | 22 | 92 | 38 | 156 | 54 | 220 |
| 7 | 32 | 23 | 96 | 39 | 160 | 55 | 224 |
| 8 | 36 | 24 | 100 | 40 | 164 | 56 | 228 |
| 9 | 40 | 25 | 104 | 41 | 168 | 57 | 232 |
| 10 | 44 | 26 | 108 | 42 | 172 | 58 | 236 |
| 11 | 48 | 27 | 112 | 43 | 176 | 59 | 240 |
| 12 | 52 | 28 | 116 | 44 | 180 | 60 | 244 |
| 13 | 56 | 29 | 120 | 45 | 184 | 61 | 248 |
| 14 | 60 | 30 | 124 | 46 | 188 | 62 | 252 |
| 15 | 64 | 31 | 128 | 47 | 192 | 63 | 256 |

FIG. 8

| Channel Usage Map(40MHz) ||||
|---|---|---|---|
| 0 | 6 | 16 | 134 |
| 1 | 14 | 17 | 142 |
| 2 | 22 | 18 | 150 |
| 3 | 30 | 19 | 158 |
| 4 | 38 | 20 | 166 |
| 5 | 46 | 21 | 174 |
| 6 | 54 | 22 | 182 |
| 7 | 62 | 23 | 190 |
| 8 | 70 | 24 | 198 |
| 9 | 78 | 25 | 206 |
| 10 | 86 | 26 | 214 |
| 11 | 94 | 27 | 222 |
| 12 | 102 | 28 | 230 |
| 13 | 110 | 29 | 238 |
| 14 | 118 | 30 | 246 |
| 15 | 126 | 31 | 254 |

FIG. 9

| Channel Usage Map (80MHz) | |
|---|---|
| 0 | 10 |
| 1 | 26 |
| 2 | 42 |
| 3 | 58 |
| 4 | 74 |
| 5 | 90 |
| 6 | 106 |
| 7 | 122 |
| 8 | 138 |
| 9 | 154 |
| 10 | 170 |
| 11 | 186 |
| 12 | 202 |
| 13 | 218 |
| 14 | 234 |
| 15 | 250 |

FIG. 10

| | Channel Usage Map (160MHz) |
|---|---|
| 0 | 18 |
| 1 | 50 |
| 2 | 82 |
| 3 | 114 |
| 4 | 146 |
| 5 | 178 |
| 6 | 210 |
| 7 | 242 |

FIG. 11

| | Announce Type |
|---|---|
| 0 | AP→STA |
| 1 | STA→AP |
| 2 | STA→OBSS |
| 3 | STA→AP(OBSS AP Report) |
| 4 | STA→AP(OBSS STA Report) |

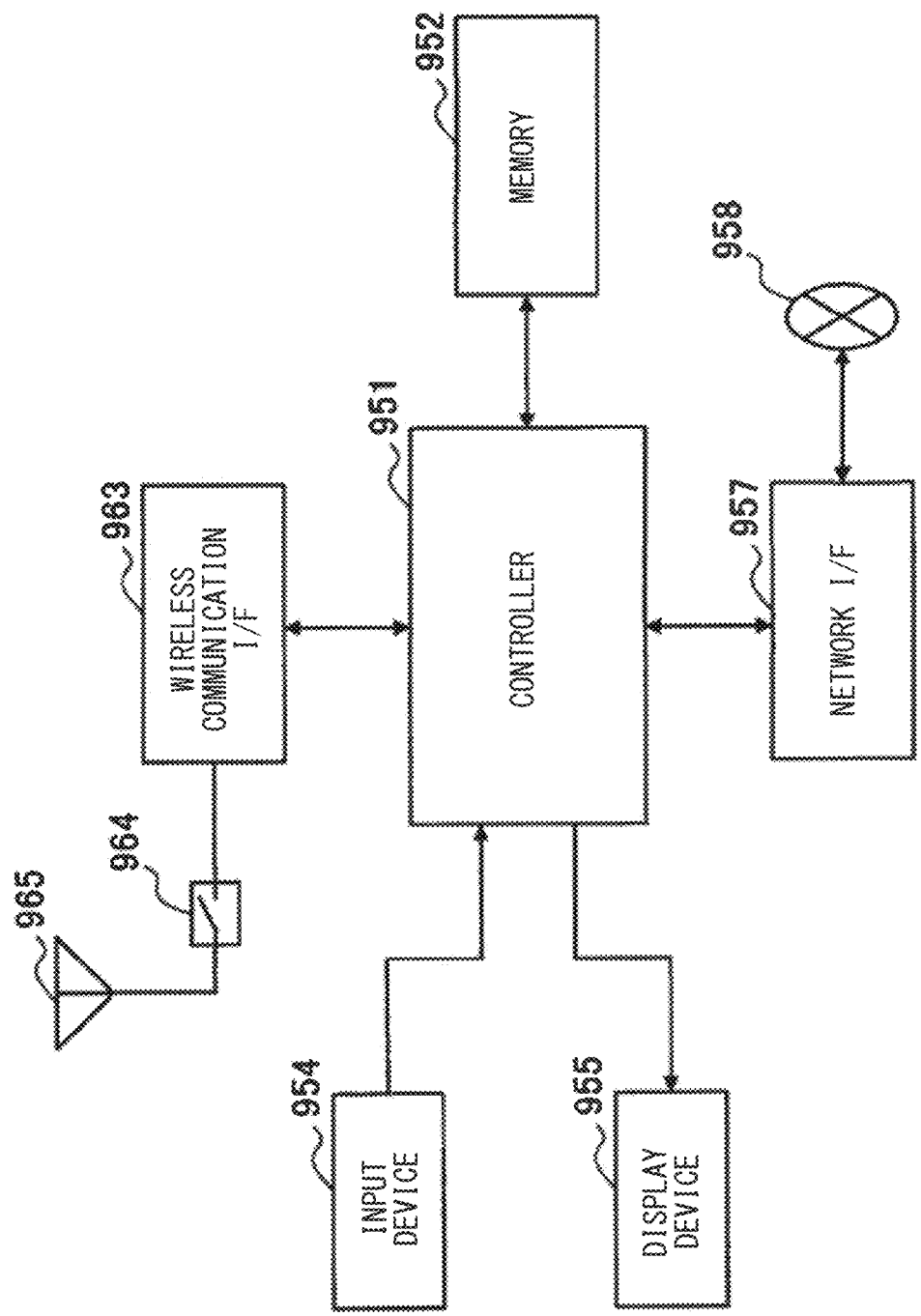

WIRELESS COMMUNICATION APPARATUS AND WIRELESS COMMUNICATION METHOD

CROSS-REFERENCE TO RELATED APPLICATIONS

The present application is a continuation of U.S. application Ser. No. 17/267,035, filed Feb. 9, 2021, which is based on PCT filing PCT/JP2019/025062, filed Jun. 25, 2019, which claims priority to JP 2018-153176, filed Aug. 16, 2018, the entire contents of each are incorporated herein by reference.

TECHNICAL FIELD

The present disclosure relates to a wireless communication apparatus and a wireless communication method.

BACKGROUND ART

Recently, a technique for making communication in a wireless LAN (Local Area Network) system more appropriate has been actively developed. For example, the following PTL 1 discloses a technique in which an access point (hereinafter referred to as an "AP") forming a basic service set (hereinafter referred to as a "BSS (Basic Service Set)") provides one or more secondary channels (or auxiliary channels) in addition to one or more primary channels (or main channels). Further, a technique is disclosed that, in a case where the AP uses the secondary channel as a downlink channel, the AP so sets a frequency band for the downlink channel (secondary channel) that the frequency band for the downlink channel does not overlap with a frequency band of the primary channel of another neighboring BSS (hereinafter referred to as an "OBSS (Overlap Basic Service Set)"). As a result, in a situation in which many stations (hereinafter referred to as "STAs (Stations)") are wirelessly connected to a single AP, data transmission delay of the AP is reduced, making it possible to improve a system performance.

CITATION LIST

Patent Literature

PTL 1: Japanese Unexamined Patent Application Publication (Translation of PCT Application) No. 2017-505082

SUMMARY OF THE INVENTION

Problem to be Solved by the Invention

However, a frequency band of a channel used in a BSS cannot be appropriately determined in some cases by the technique disclosed in PTL 1 or the like. For example, an AP of a wireless LAN sometimes continues, in communication performed by the BSS formed by itself, to use a frequency band of a channel initially set at the time of manufacturing without changing it, unless a predetermined setting or operation is performed (for example, unless the user intentionally configures a predetermined setting). As a result, in a case where an OBSS having a used channel overlapping with the used channel of the BSS exists, a signal communicated by the BSS and a signal communicated by the OBSS interference with each other.

Accordingly, the present disclosure has been made in view of the above, and provides a new and improved wireless communication apparatus and a new and improved wireless communication method that are each capable of more appropriately determining a frequency band of a channel used in a BSS.

Means for Solving the Problem

According to the present disclosure, there is provided a wireless communication apparatus serving as an access point of a wireless LAN. The wireless communication apparatus includes a wireless communication unit and a controller. The wireless communication unit receives a signal including information regarding a channel used in an OBSS (Overlap Basic Service Set). The controller determines a frequency band of a channel used in a BSS (Basic Service Set) on the basis of the information regarding the channel used in the OBSS.

Further, according to the present disclosure, there is provided a wireless communication method to be performed by an access point of a wireless LAN. The wireless communication method includes: receiving a signal including information regarding a channel used in an OBSS; and determining a frequency band of a channel used in a BSS on the basis of the information regarding the channel used in the OBSS.

Further, according to the present disclosure, there is provided a wireless communication apparatus serving as a station of a wireless LAN. The wireless communication apparatus includes a signal generating unit and a wireless communication unit. The signal generating unit generates a signal including information regarding a channel used in an OBSS. The information is used to determine a frequency band of a channel used in a BSS. The wireless communication unit transmits the signal including the information regarding the channel used in the OBSS to an external apparatus belonging to the BSS.

Further, according to the present disclosure, there is provided a wireless communication method to be performed by a station of a wireless LAN. The wireless communication method includes: generating a signal including information regarding a channel used in an OBSS, the information being used to determine a frequency band of a channel used in a BSS; and transmitting the signal including the information regarding the channel used in the OBSS to an external apparatus belonging to the BSS.

Effect of the Invention

As described above, according to the present disclosure, it is possible to more appropriately determine a frequency band of a channel used in a BSS.

Note that the above-described effect is not necessarily limiting, and any of the effects described in the present specification or other effects that can be understood from the present specification may be provided together with or instead of the above-described effect.

BRIEF DESCRIPTION OF THE DRAWINGS

FIG. 7 is a diagram for describing a Channel Usage Map in the channel notification signal.

FIG. 8 is a diagram for describing the Channel Usage Map in the channel notification signal.

FIG. 9 is a diagram for describing the Channel Usage Map in the channel notification signal.

FIG. 10 is a diagram for describing the Channel Usage Map in the channel notification signal.

FIG. 11 is a diagram for describing an Announce Type in the channel notification signal.

FIG. 22 is a block diagram illustrating an example of a schematic configuration of a wireless access point.

MODES FOR CARRYING OUT THE INVENTION

Figure 1:
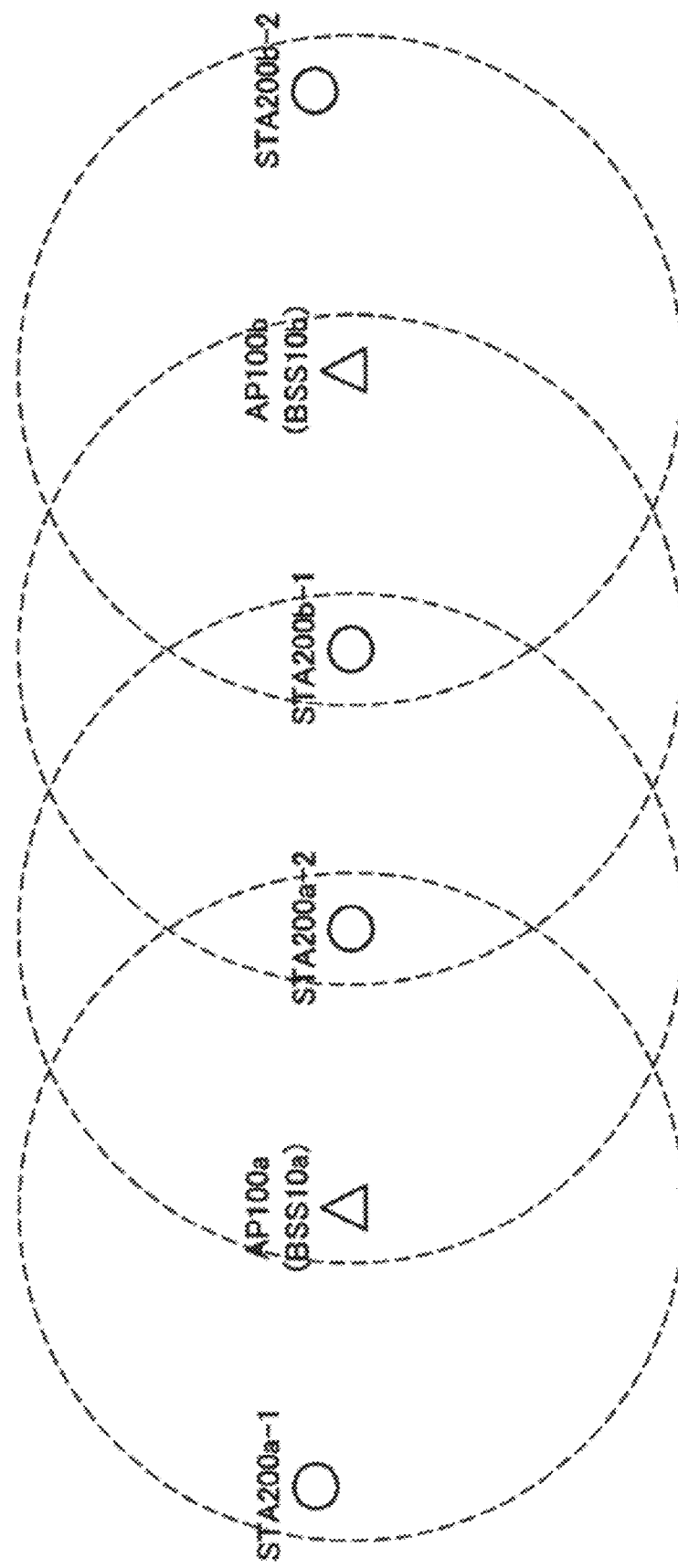
FIG. 1 is a diagram illustrating a configuration example of a wireless LAN system.

The following describes a preferred embodiment of the present disclosure in detail with reference to the accompanying drawings. It is to be noted that, in this specification and the appended drawings, components that have substantially the same function and configuration are denoted with the same reference numeral, thereby refraining from repeatedly describing these components.

It should be noted that the description is given in the following order.

1. Background
2. Embodiment
   2.1. Overview
   2.2. Examples of Frame Configuration
   2.3. Examples of Functional Configuration
   2.4. Examples of Processing Flow
3. Application Examples
4. Conclusion

1. BACKGROUND

First, the background of the present disclosure is described.

In a communication scheme conforming to the existing wireless LAN system standard such as IEEE802.11a or IEEE802.11g in which a technique such as an OFDM (Orthogonal Frequency-Division Multiplexing) is used, basically, 20 [MHz] is set as a frequency band width. This is defined as a single channel.

However, as an increase in a communication speed has been demanded, in a communication scheme conforming to a successor standard IEEE802.11n, a technique of simultaneously communicating with two adjacent channels has been employed. In addition, in a communication scheme conforming to IEEE802.11ac, a channel bonding technique that allows more channels to be used together for communication has been employed. Thus, up to eight channels, i.e. up to a frequency band width of 160 [MHz] can be used together for communication.

Taking into consideration the above, it is expected that the demand for a further higher communication speed will be increased in the future as well. For example, it is expected that a communication technique using even more channels will be developed.

Here, in an existing communication scheme using a multi-channel, in a case where a transmission line becomes accessible by a predetermined access control in a primary channel, if a secondary channel is not used, the primary channel and the secondary channel can be used together for communication. For example, in a case where a predetermined access control enables access to a transmission line in a primary channel of 20 [MHz], if a secondary channel of 20 [MHz] is not used, these can be used together as a primary channel of 40 [MHz]. Similarly, for example, a primary channel of 40 [MHz] and a secondary channel of 40 [MHz] can be used together as a primary channel of 80 [MHz]. Similarly, for example, a primary channel of 80 [MHz] and a secondary channel of 80 [MHz] can be used together as a primary channel of 160 [MHz].

However, as described above, in the existing wireless LAN system, the AP sometimes is not able to appropriately determine the frequency band of the channel used in the BSS. For example, the AP sometimes continues, in communication performed by the BSS formed by itself, to use a frequency band of a channel (including, for example, a primary channel, a secondary channel, and the like) that is initially set at the time of manufacturing without changing it, unless a predetermined setting or operation is performed (for example, unless a user intentionally configures a predetermined setting). As a result, in a case where an OBSS having a used channel overlapping with the used channel of the BSS exists, the signal communicated by the BSS and the signal communicated by OBSS interfere with each other.

Further, in the technique disclosed in the above-described PTL 1, the frequency band of the downlink channel can be appropriately set so as not to overlap with the frequency band of the primary channel of the OBSS. However, it is not considered to appropriately set a frequency band of another channel used in normal two-way directions or an uplink channel. Therefore, in uplink communication, interference sometimes occurs between the BSS and the OBSS.

Further, the above-described PTL 1 discloses a technique of suppressing interference between the BSS and the OBSS by making the downlink channel used in a central region of the network different from the downlink channel used in a boundary region of the network. However, in a case where there are many OBSSs for a certain BSS, there is a possibility that the downlink channel used in the central region of the network cannot be different from the downlink channel used in the boundary region.

In view of these circumstances, the disclosing party of this has created the technology regarding the present disclosure. An AP 100 according to the present disclosure receives a signal including information regarding a channel used in an OBSS, and determines a frequency band of a channel used in a BSS on the basis of the information regarding the channel used in the OBSS. More specifically, the AP 100 dynamically changes the frequency band of the channel (a primary channel and a secondary channel) used in the BSS on the basis of the information regarding the channel used in the OBSS. Further, an STA 200 generates a signal including information regarding the channel used in the OBSS, which is used to determine the frequency band of the channel used in the BSS, and transmits the signal to the AP 100 belonging to the BSS.

This allows the AP 100 to more appropriately determine the frequency band of the channel used in the BSS. More specifically, the AP 100 dynamically changes the frequency band of the channel (the primary channel and the secondary channel) used in the BSS, making it possible to suppress occurrence of interference between the signal of the BSS and the signal of the OBSS.

In addition, the AP 100 is able to set the frequency band of not only the downlink channel but also another channel used in the normal two-way directions or a channel usable also in uplink communication so that it does not overlap with the frequency band of the channel used in the OBSS. Therefore, it is possible to suppress occurrence of interference between the signal of the BSS and the signal of the OBSS not only in the downlink communication but also in the uplink communication.

Moreover, also in a case where many OBSSs are present for a certain BSS, it is more likely that the AP 100 is able to set the frequency band of the channel used in the BSS so that it does not overlap with the frequency band of the channel used in the OBSS. In the following, an embodiment of the present disclosure will be described in detail.

2. EMBODIMENT

2.1. Overview

The background of the present disclosure has been described above. Subsequently, an overview of an embodiment of the present disclosure will be described.

FIG. 1 is a diagram illustrating a configuration example of a wireless LAN system according to the present embodiment. As illustrated in FIG. 1, the wireless LAN system according to the present embodiment includes the AP 100 and the STA 200. Further, a BSS 10 includes a single AP 100 and one or more STAs 200. In the present embodiment, an AP 100a forms a BSS 10a, and an STA 200a-1 and an STA 200a-2 belonging to the BSS 10a are positioned in a region of the BSS 10a. Further, an AP 100b forms a BSS 10b that is an OBSS to the BSS 10a, and an STA 200b-1 and an STA 200b-2 belonging to the BSS 10b are positioned in a region of the BSS 10b. Further, the STA 200a-2 and the STA 200b-1 belonging to the respective BSSs 10 different from each other are present at positions that allow for reception of transmission signals of each other. Therefore, there is a possibility that interference occurs due to their transmission signals.

Note that the configuration of the wireless LAN system to which the present disclosure is applied is not limited to the example illustrated in FIG. 1. For example, modes of the number, a positional relationship, and a communicable range of the AP 100 and the STA 200 are not particularly limited.

Here, as described above, the AP 100 receives a signal including information regarding a channel used in the OBSS, and determines a frequency band of a channel used in the BSS 10 on the basis of the information regarding the channel used in the OBSS. More specifically, the AP 100 dynamically changes the frequency band of the channel (the primary channel and the secondary channel) used in the BSS 10 on the basis of the information regarding the channel used in the OBSS.

The "information regarding the channel used in the OBSS" includes information regarding the primary channel used in the OBSS and information regarding the secondary channel used in the OBSS. The AP 100 receives the signal including the information from a wireless communication apparatus (such as the AP 100 or the STA 200) belonging to the OBSS. Note that, in a case where the STA 200 belonging to the BSS 10 receives the signal including the information regarding the channel used in the OBSS from the wireless communication apparatus (such as the AP 100 or the STA 200) belonging to the OBSS, the AP 100 may receive the signal including the information regarding the channel used in the OBSS from the STA 200 (in other words, the exchange of a signal between the AP 100 and the wireless communication apparatus belonging to the OBSS may be achieved by intermediation of the STA 200). The intermediation of the STA 200 allows the AP 100 to acquire the information regarding the channel used in the OBSS in a wider range.

The "information regarding the primary channel" includes some information that allows for identification of the frequency band of the primary channel. For example, the information regarding the primary channel may include identification information of the primary channel (or the frequency band of the primary channel), etc.

Further, the "information regarding the secondary channel" includes some information that allows for identification of the frequency band of the secondary channel. For example, the information regarding the secondary channel may include identification information of the secondary channel (or the frequency band of the secondary channel), etc. Further, in the present embodiment, assumed is a case of using one or more secondary channels. However, in a case where two or more secondary channels are used, the information regarding the secondary channel may include information regarding priorities of the secondary channels used in the OBSS. Further, the information regarding the secondary channel may include the information that allows for identification of the frequency band of the secondary channel used in the OBSS and some information that allows for recognition of the order or likelihood of the use of the secondary channels.

Figure 2:
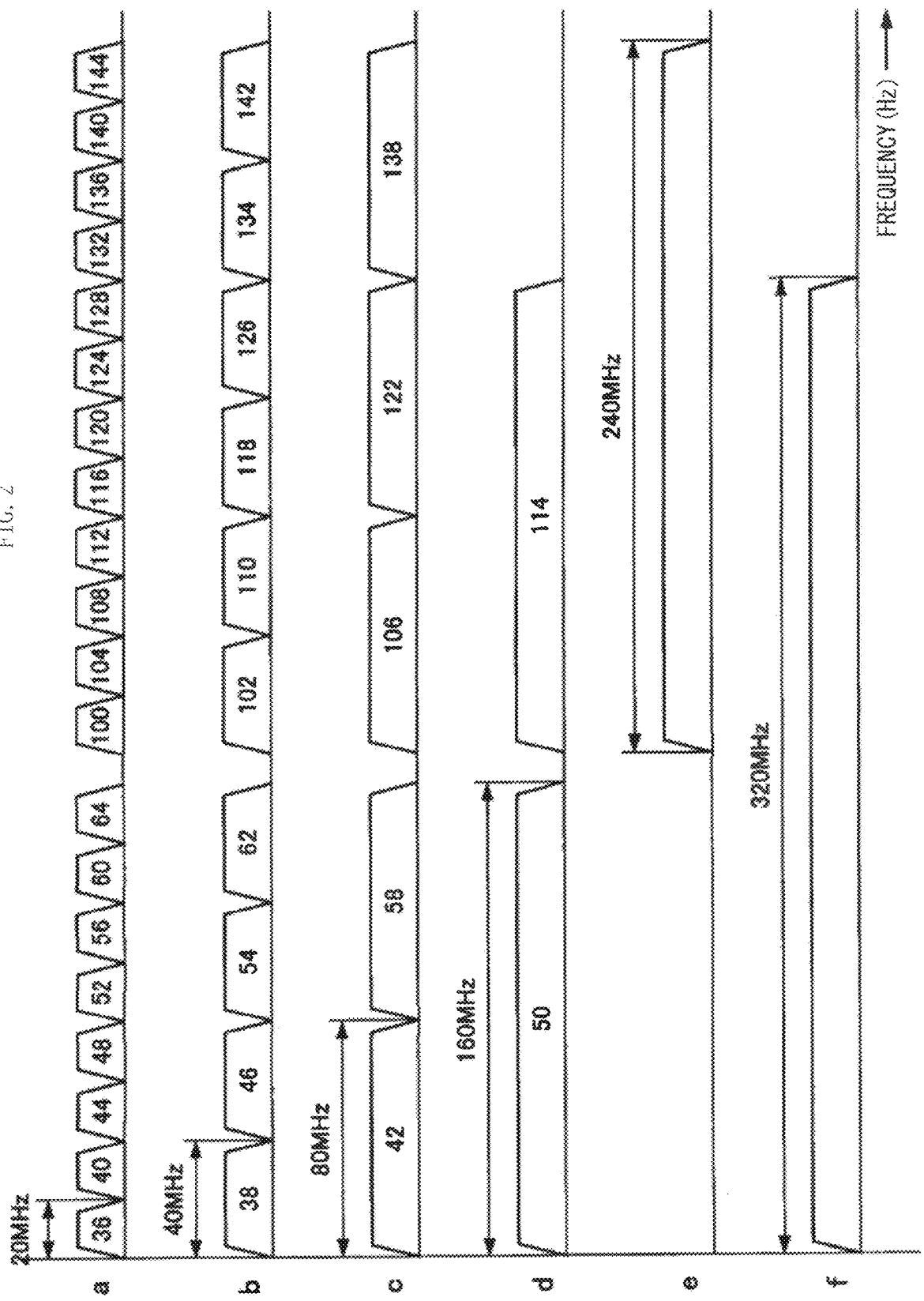
FIG. 2 is a diagram for describing a specific example of a method of setting a used channel by an AP 100.

Here, referring to FIGS. 2 to 4, specific examples of a method of setting the used channel by the AP 100 will be described. FIG. 2 is a diagram illustrating a part of usable channels in a 5 [GHz] band, including a future extended region. As illustrated in a of FIG. 2, as channels usable in a unit of 20 [MHz], there are channels 36, 40, 44, 48, 52, 56, 60, and 64 in a low frequency band, and further, there are channels 100, 104, 108, 112, 116, 120, 124, 128, 132, 136, 140, and 144 in a high frequency band.

Moreover, as illustrated in b of FIG. 2, as channels usable in a unit of 40 [MHz], there are channels 38, 46, 54, and 62 in a low frequency band, and further, there are channels 102, 110, 118, 126, 134, and 142 in a high frequency band.

Moreover, as illustrated in c of FIG. 2, as channels usable in a unit of 80 [MHz], there are channels 42 and 58 in a low frequency band, and further, there are channels 106, 122, and 138 in a high frequency band.

Moreover, as illustrated in d in FIG. 2, as channels usable in a unit of 160 [MHz], there is a channel 50 in a low frequency band, and further, there is a channel 114 in a high frequency band.

Moreover, although not specified in the current wireless LAN standard, e in FIG. 2 illustrates a channel which is provided in a relatively high frequency band and which is usable in a unit of 240 [MHz], and f in FIG. 2 illustrates a channel which is provided from a relatively low frequency band to a relatively high frequency band and which is usable in a unit of 320 [MHz].

Note that the channels used in the present embodiment are not limited to those of the example in FIG. 2. More specifically, a channel present in a frequency band other than the 5 [GHz] band may be used. A channel having number other than the channel numbers described above may be used. A channel other than those having the band widths described above (for example, other than 20, 40, 80, 160, 240, and 320 [MHz]) may be used. In addition, regarding the usable channel, the usable channel can be flexibly changed according to the legal system of each country because the permitted frequency band differs depending on the legal system of each country.

Figure 3:
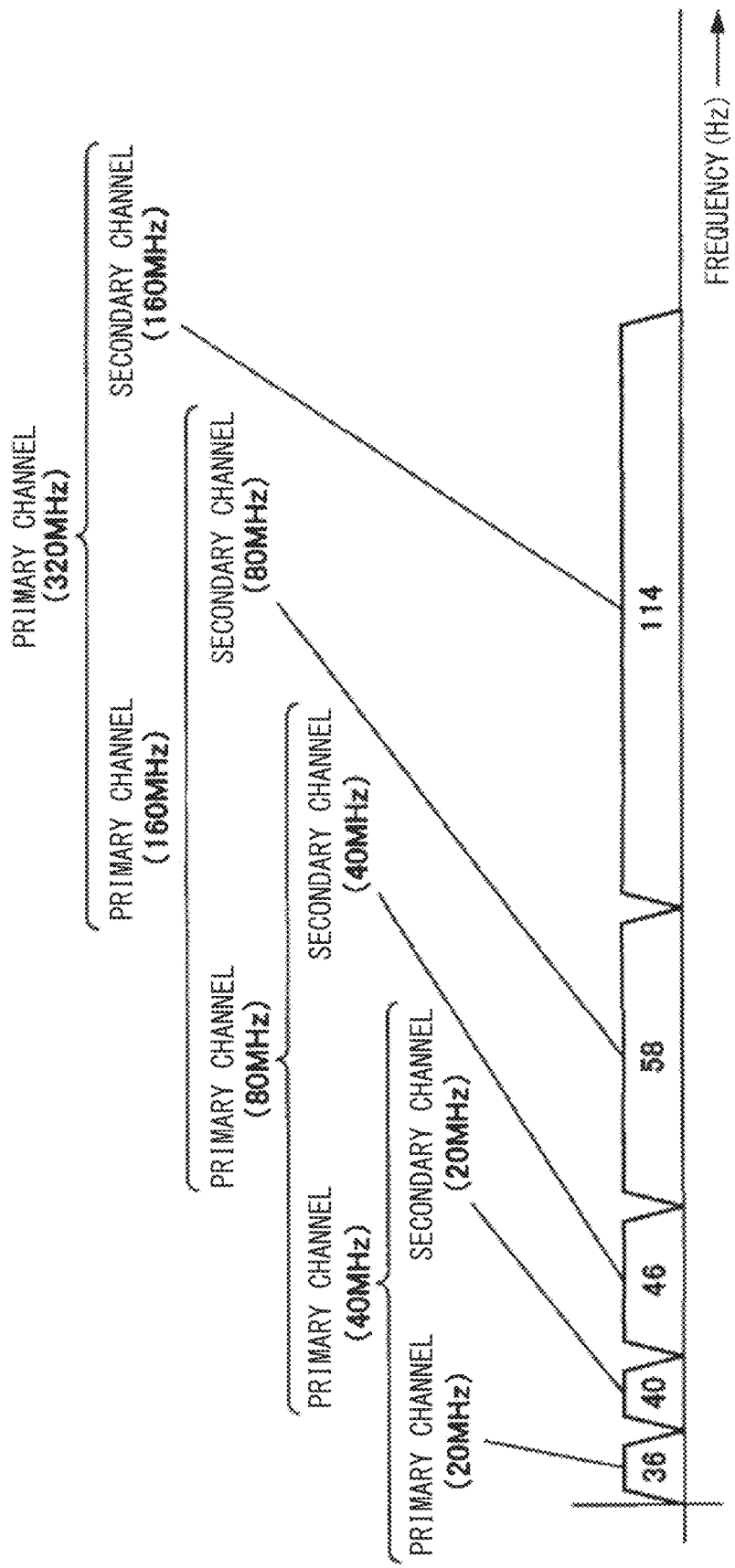
FIG. 3 is a diagram for describing a specific example of the method of setting the used channel by the AP 100.

FIG. 3 is a diagram illustrating a setting example of the primary channel and the secondary channel in the present embodiment. More specifically, FIG. 3 illustrates, for example for convenience, a case where the AP 100 sets the channel 36 of 20 [MHz] as the primary channel, and in addition, the AP 100 sets each of the channel 40 of 20 [MHz] adjacent to that primary channel, the channel 46 of 40 [MHz], the channel 58 of 80 [MHz], and the channel 114 of 160 [MHz] as the secondary channel (in other words, the AP 100 sets the frequency bands of a plurality of secondary channels with band widths different from each other).

Further, the AP 100 can use a combination of the channel 36 of 20 [MHz] which is the primary channel and the channel 40 of 20 [MHz] which is the secondary channel as a primary channel of 40 [MHz].

Further, the AP 100 can use a combination of that primary channel of 40 [MHz] and the channel 46 of 40 [MHz] which is the secondary channel as a primary channel of 80 [MHz]. Similarly, the AP 100 can use a combination of that primary channel of 80 [MHz] and the channel 58 of 80 [MHz] which is the secondary channel as a primary channel of 160 [MHz]. Further, similarly, the AP 100 can use a combination of that primary channel of 160 [MHz] and the channel 114 of 160 [MHz] which is the secondary channel as a primary channel of 320 [MHz].

Note that the setting example of the primary channel and the secondary channel is not limited to the example in FIG. 3. More specifically, the AP100 may not necessarily increase the frequency band width by a factor of two as 20, 40, 80, 160, and 320 [MHz]. For example, the AP 100 may so configure the setting that a channel of a frequency band width achievable by a free combination of the usable channels such as 20, 60, 100, or 180 [MHz] is used as the primary channel. Further, the AP 100 does not necessarily have to be combine channels adjacent to each other (for example, the channel 36 and the channel 40 in FIG. 2, etc.).

In the present embodiment, the AP 100 usually uses a channel of 20 [MHz], and increases the frequency band width of the channel as appropriate in accordance with the necessity for an increase in frequency band width and the channel used (or possibly used) in the OBSS.

Here, the "necessity for an increase in frequency band width" is determined on the basis of, for example, the size of data to be communicated, the urgency of communication, and the like, but these are not limitative. More specifically, for example, in a case where the size of the data to be communicated is larger than a predetermined value or in a case where the urgency of communication is high, the AP 100 is allowed to increase the frequency band width of the channel as appropriate, as described above.

Moreover, the "channel used (or possibly used) in the OBSS" is determined on the basis of the information regarding the primary channel and the secondary channel used in the OBSS, which is included in the information regarding the channel used in the OBSS described above.

Further, the AP 100 that has increased the frequency band width reduces the frequency band width of the channel as appropriate in accordance with the necessity for an increase in frequency band width and the channel used (or possibly used) in the OBSS. For example, in a case where communication of data having a size larger than a predetermined value is properly completed, the AP 100 may return the primary channel to a channel of 20 [MHz]. Further, for example, the AP 100 may return the primary channel to a channel of 20 [MHz] in a case where the channel used in the OBSS and the channel used in its own BSS 10 overlap with each other. Thus, the AP 100 is able to suppress occurrence of interference between the signal of the BSS 10 and the signal of the OBSS.

Figure 4:
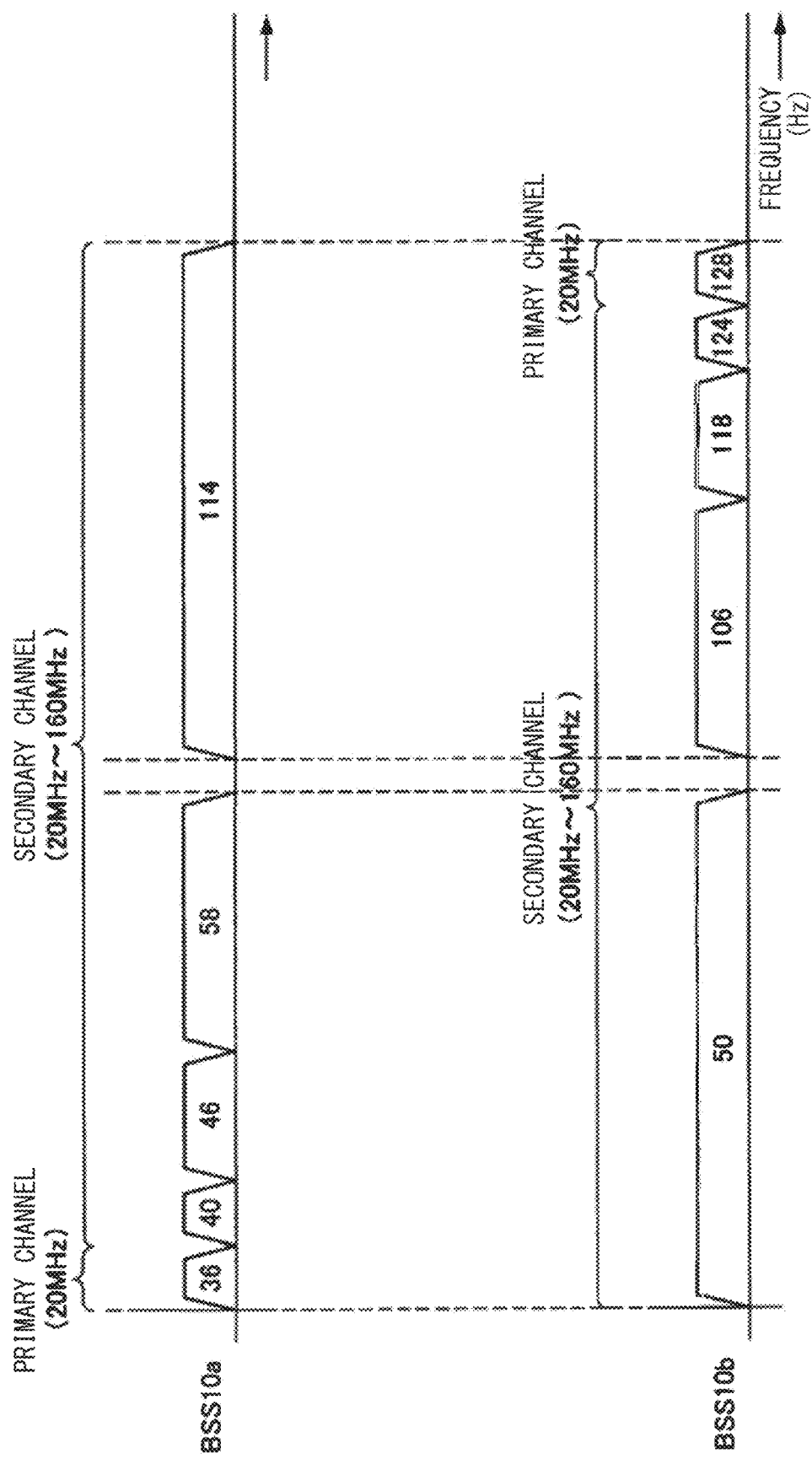
FIG. 4 is a diagram for describing a specific example of the method of setting the used channel by the AP 100.

FIG. 4 is a diagram illustrating a setting example of the primary channel and the secondary channel in a plurality of BSSs 10 (the BSS10 and the OBSS). As illustrated in FIG. 4, assume that the AP 100a forming the BSS 10a sets the channel 36 of 20 [MHz] as the primary channel, and in addition, sets each of the channel 40 of 20 [MHz], the channel 46 of 40 [MHz], the channel 58 of 80 [MHz], and the channel 114 of 160 [MHz] as the secondary channel.

Meanwhile, the AP 100b forming the BSS 10b receives a signal including information regarding the primary channel and the secondary channel of the BSS 10a, and determines the frequency band of the primary channel and the secondary channel of the BSS 10b on the basis of the information. For example, the AP 100b determines the frequency band (for example, the frequency band farthest from the primary channel of the BSS 10a) that is unlikely to be used in the OBSS (the BSS 10a that is the OBSS to the BSS 10b) as the frequency band of the primary channel used in the BSS 10b. More specifically, as illustrated in FIG. 4, the AP 100b determines the frequency band farthest from the primary channel (the channel 36) used in the BSS 10a that is the OBSS of the usable frequency bands (in the example in FIG. 4, the frequency band corresponding to the channel 36 to the channel 128), as the frequency band of the primary channel used in the BSS 10b (in other words, the AP 100b determines the channel 128 as the primary channel).

Further, the AP 100b sets the secondary channel in a direction opposite to the BSS 10a (in other words, in a decreasing direction of the frequency) regarding the frequency from the determined primary channel as a reference. More specifically, as illustrated in FIG. 4, the AP 100b sets each of the channel 124 of 20 [MHz] adjacent to the determined primary channel, the channel 118 of 40 [MHz], the channel 106 of 80 [MHz], and the channel 50 of 160 [MHz] as the secondary channel (note that, for this process, it can be said that the AP 100b determines the frequency band of the secondary channel used in the BSS 10 on the basis of the information regarding the channel used in the OBSS).

This allows each AP 100 to use the channel with higher priority while suppressing occurrence of interference between the signal of the BSS 10a and the signal of the BSS 10b. More specifically, also in a case where the AP 100a and the AP 100b each increase the frequency band width on the basis of its own priority, it is possible to reduce the possibility that the used frequency bands overlap with each other (in the example in FIG. 4, no interference occurs because the frequency band used by the AP 100a and the frequency band used by the AP 100b do not overlap with each other if the increase in frequency band width is up to 160 [MHz]).

If there are three or more neighboring BSSs 10, the APs 100 forming the respective BSSs 10 each set the primary channel and the secondary channel so that the frequency bands used in the respective BSSs 10 do not overlap as much as possible, as in the method described with reference to FIG. 4. For example, in a case where two APs 100 forming two of the three neighboring BSSs 10 each set the primary channel and the secondary channel by the method described with reference to FIG. 4, the remaining AP 100 sets, as the primary channel, a channel corresponding to the frequency band positioned near a midpoint of the frequency bands of the primary channels set by the two APs 100. Further, that AP 100 sets, as the secondary channel, a channel having the frequency band as close as possible to the primary channel.

Note that the method of setting the primary channel and the secondary channel in a plurality of BSSs 10 is not limited to the above. More specifically, as long as the primary channel and the secondary channel are allowed to be so set that the frequency bands used in the respective BSSs 10 do not overlap as much as possible, channels adjacent to each other may not necessarily be set as the primary channel and the secondary channel (in other words, the primary channel and the secondary channel may be set to a combination of channels which are not adjacent to each other).

Figure 5:
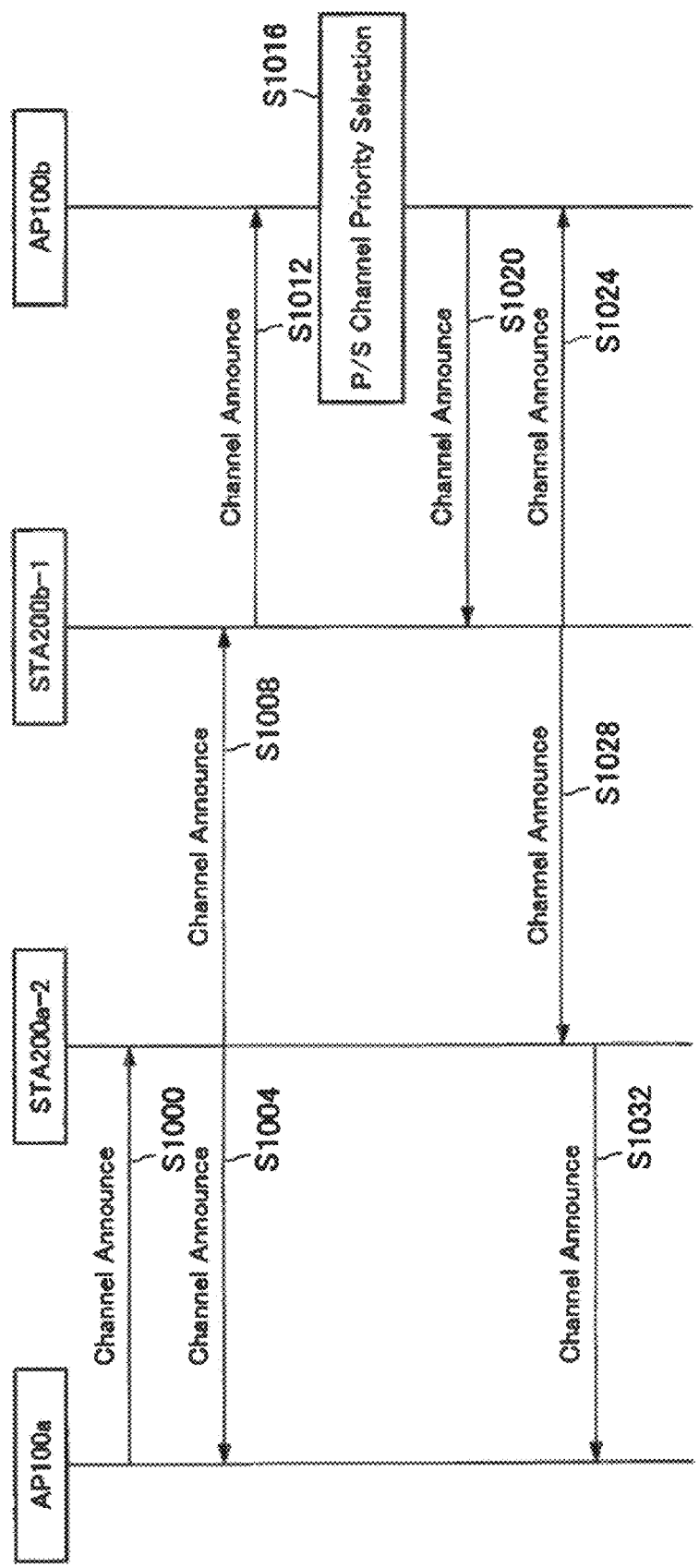
FIG. 5 is a sequence diagram illustrating an example of a process flow of the AP 100 and an STA 200.

FIG. 5 is a sequence diagram illustrating an example of a process flow of the AP 100 and the STA 200 according to the present embodiment. More specifically, the AP 100 and the STA 200 each communicate a signal (hereinafter referred to as a "channel notification signal" or "Channel Announce") including information regarding the primary channel and the secondary channel, and FIG. 5 mainly illustrates an example of a communication flow of the signal. Assume that the AP 100a forming the BSS 10a has set the frequency bands of the primary channel and the secondary channel used in the BSS 10a by a predetermined method.

Thereafter, in step S1000, the AP 100a transmits the channel notification signal (Channel Announce) to the STA200a-2 belonging to the BSS 10a. The channel notification signal is a signal including the information regarding the primary channel and the secondary channel.

When the STA 200a-2 receives the channel notification signal, the STA 200a-2 sets the frequency bands of the primary channel and the secondary channel on the basis of the information regarding the primary channel and the secondary channel included in the signal. In step S1004, the STA 200a-2 generates a channel notification signal including information regarding the primary channel and the secondary channel that have been set, and transmits the signal to the AP 100a in order to report that setting of the frequency bands of the primary channel and the secondary channel has been completed. As a result, the AP 100a is allowed to recognize a channel setting status of the STA 200a-2. Note that the STA 200a-2 may transmit a simple answering signal to the AP 100a rather than the channel notification signal, or the STA 200a-2 may omit the transmission of the channel notification signal to the AP 100a.

In step S1008, the STA 200a-2 determines whether or not transmission of the channel notification signal to an external apparatus other than the AP 100a is necessary, and transmits the channel notification signal as appropriate. For example, in a case where a neighboring OBSS (the BSS 10b in the example in FIG. 5) is present, the STA 200a-2 generates a channel notification signal including information regarding the primary channel and the secondary channel, and transmits the signal to an external apparatus belonging to the BSS 10b. Thereby, the external apparatus belonging to the BSS 10b, which is the OBSS, is allowed to recognize the frequency bands of the primary channel and the secondary channel used in the BSS 10a.

Here, there is no particular limitation on the method of recognizing the presence of the BSS 10b, which is the neighboring OBSS, by the STA 200a-2. For example, in a case where the STA 200a-2 receives a signal from the BSS 10b, the STA 200a-2 may recognize the presence of the BSS 10b by analyzing the signal. For example, the STA 200a-2 may recognize the presence of the BSS 10b by receiving a signal from an external apparatus, such as the AP 100a, giving notification of the presence of the BSS 10b. Note that the method of determining whether or not the transmission of the channel notification signal to the external apparatus other than the AP 100a is necessary is not limited to the above. For example, the STA 200a-2 may determine whether or not the transmission of the channel notification signal to the external apparatus other than the AP 100a is necessary on the basis of a pre-setting (such as a user setting). Further, the STA 200a-2 may always transmit the channel notification signal to the external apparatus other than the AP 100a without determining whether or not the transmission of the channel notification signal to the external apparatus other than the AP 100a is necessary (for example, without determining presence or absence of a neighboring OBSS). Further, the STA 200a-2 may omit the transmission of the channel notification signal to the external apparatus other than the AP 100a. In this case, the external apparatus belonging to the BSS 10b may be allowed to recognize the frequency bands of the primary channel and the secondary channel used in the BSS 10a by receiving the channel notification signal transmitted by the STA 200a-2 to the AP 100a in step S1004 and analyzing the signal.

The STA 200b-1 that has received the channel notification signal transmitted by the STA 200a-2 recognizes the presence of the BSS 10a, which is the neighboring OBSS, and the frequency bands of the primary channel and the secondary channel used in the BSS 10a by analyzing the signal. Further, in step S1012, the STA 200b-1 generates a channel notification signal including information regarding the primary channel and the secondary channel used in the BSS 10a and transmits the signal to the AP 100b, in order to report the frequency bands of the primary channel and the secondary channel used in the BSS 10a to the AP 100b.

In step S1016, the AP 100b that has received the channel notification signal transmitted by the STA 200b-1 recognizes the presence of the BSS 10a, which is the neighboring OBSS, and the frequency bands of the primary channel and the secondary channel used in the BSS 10a by analyzing the signal. Further, the AP 100b determines the frequency bands of the primary channel and the secondary channel used in the BSS 10b, by the method described with reference to FIG. 4 above, etc. on the basis of the frequency bands of the primary channel and the secondary channel used in the BSS 10a. For example, the AP 100b determines the frequency band farthest from the primary channel used in the BSS 10a as the frequency band of the primary channel used in the BSS 10b.

Thereafter, in step S1020, the AP 100b transmits the channel notification signal, which is the signal including the information regarding the primary channel and the secondary channel, to the STA 200b-1 belonging to the BSS 10b.

When the STA 200b-1 receives the channel notification signal, the STA 200b-1 sets the frequency bands of the primary channel and the secondary channel on the basis of the information regarding the primary channel and the secondary channel included in the signal. In step S1024, the STA 200b-1 generates a channel notification signal including information regarding the primary channel and the secondary channel that have been set, and transmits the signal to the AP 100b in order to report that setting of the frequency bands of the primary channel and the secondary channel has been completed.

In step S1028, the STA 200b-1 determines whether or not transmission of the channel notification signal to the external apparatus other than the AP 100b is necessary, and transmits the channel notification signal as appropriate. For example, in a case where a neighboring OBSS (the BSS 10a in the example in FIG. 5) is present, the STA 200b-1 generates a channel notification signal including the information regarding the primary channel and the secondary channel, and transmits the signal to an external apparatus belonging to the BSS 10a.

The STA 200a-2 receiving the channel notification signal transmitted by the STA 200b-1 analyzes the signal and thereby recognizes the presence of the BSS 10b, which is the neighboring OBSS, and the frequency bands of the primary channel and the secondary channel used in the BSS 10b. Thereafter, in step S1032, the STA 200a-2 generates a channel notification signal including information regarding the primary channel and the secondary channel used in the BSS 10b and transmits the signal to the AP 100a in order to report the frequency bands of the primary channel and the secondary channel used in the BSS 10b to the AP 100a. Thereby, the AP 100a recognizes the presence of the BSS 10b, which is the neighboring OBSS, and the frequency bands of the primary channel and the secondary channel used in the BSS 10b by analyzing the signal.

By the above-described process, the frequency bands of the primary channel and the secondary channel are autonomously adjusted so that occurrence of interference between the BSSs 10 (the BSS 10a and the BSS10b) is suppressed.

Note that the AP 100a and the AP 100b may set the frequency bands of the primary channel and the secondary channel by performing the process illustrated in FIG. 5 a plurality of times. For example, in a case where the AP 100b cannot configure an appropriate setting on the basis of the frequency bands of the primary channel and the secondary channel set by the AP 100a, the AP 100a may perform re-setting on the basis of the frequency bands of the primary channel and the secondary channel set by the AP 100b. Further, in a case where the process illustrated in FIG. 5 is repeated predetermined number of times, each AP 100 may stop the process illustrated in FIG. 5 even if the appropriate setting has not been configured (in other words, each AP 100 may continue the communication still with the setting which is likely to cause the interference). Further, the communication of the channel notification signal between the different BSSs 10 may not be achieved by the STAs 200 (the STA 200a-2 and the STA 200b-1 in the example in FIG. 5) belonging to the different BSSs 10. For example, the communication of the channel notification signal between the different BSSs 10 may be achieved by the APs 100 (for example, the AP 100a and the AP 100b), or by the AP 100 and the STA 200 (for example, by the AP 100a and the STA 200b-1, or by the AP 100b and the STA 200a-2).

2.2. Examples of Frame Configuration

The foregoing has outlined one embodiment of the present disclosure. Next, referring to FIGS. 6 to 11, examples of the configuration of the channel notification signal communicated in the wireless LAN system according to the present embodiment will be described. Note that, in the present embodiment, the description is given on the assumption that the channel notification signal is a "frame". However, the type of the signal for implementing the channel notification signal is not particularly limited. Further, it is also assumed that the channel notification signal is implemented as a management frame, a control frame, or an action frame in the wireless LAN system. However, these are not limitative.

Figure 6:
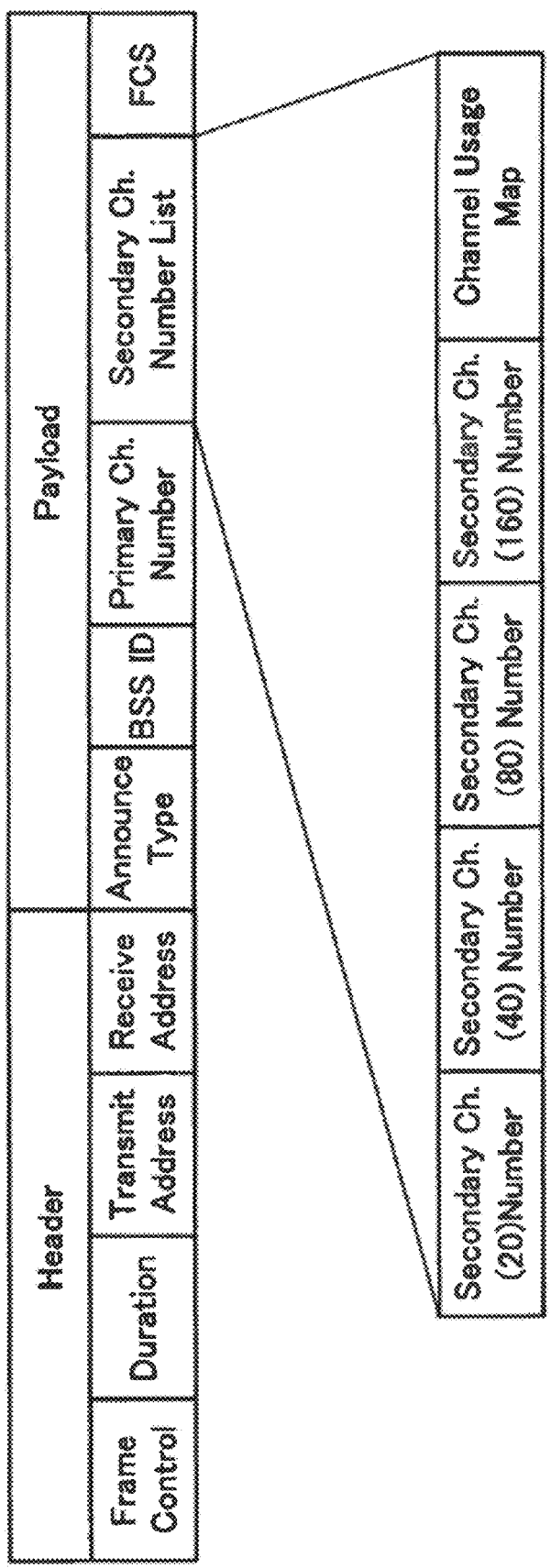
FIG. 6 is a diagram illustrating a configuration example of a channel notification signal.

FIG. 6 is a diagram illustrating an example of a frame configuration of the channel notification signal. As illustrated in FIG. 6, the channel notification signal has Frame Control, Duration, Transmit Address, and Receive Address in a Header part, and has Announce Type, BSS ID, Primary Ch. Number, Secondary Ch. Number List, and FCS in a Payload part.

The Frame Control is information used to identify a format of the frame. The Duration is information used to recognize a duration (frame length) of the frame. The Transmit Address is address information used to identify a wireless communication apparatus that is a transmission source of the frame. The Receive Address is address information used to identify the wireless communication apparatus that is a destination of the frame. In a case where no particular destination is specified, a broadcast address is specified as the Receive Address.

The Announce Type is information used to identify the type of the channel notification signal. The details will be described later. The BSS ID is information used to identify the BSS 10 that communicates the frame. The Primary Ch. Number is information used to identify a primary channel (for example, a channel of 20 [MHz]). The Secondary Ch. Number List is information used to identify a secondary channel and to recognize a priority. The FCS is information used to detect an error of the frame.

The Secondary Ch. Number List will be described in more detail. As illustrated in FIG. 6, the Secondary Ch. Number List includes Secondary Ch. (20) Number, Secondary Ch. (40) Number, Secondary Ch. (80) Number, Secondary Ch. (160) Number, and Channel Usage Map.

The Secondary Ch. (20) Number, the Secondary Ch. (40) Number, the Secondary Ch. (80) Number, and the Secondary Ch. (160) Number are information used to identify the secondary channels of 20, 40, 80, and 160 [MHz], respectively (for example, channel numbers of the secondary channels, etc.). Here, a content of the information used to identify the secondary channel is not particularly limited. For example, the channel number of the secondary channel may be stored directly. For example, the secondary channel may be indicated in a bitmap format. Further, in the present embodiment, the secondary channels have higher priorities in the order of 20, 40, 80, and 160 [MHz] (in other words, in the order of the frequency band widths). By indicating the priorities of the secondary channels by the channel notification signal, the AP 100 is allowed to recognize the possibility of the use of each secondary channel in the OBSS. Therefore, the AP 100 is allowed to more appropriately control the communication of its own BSS 10.

Note that the way of indicating the priorities of the secondary channels is not limited to the above. For example, the priorities of the secondary channels may be higher in the order of storage in frames rather than in the order of the frequency band widths. Further, it is assumed that the Secondary Ch. (20) Number, the Secondary Ch. (40) Number, the Secondary Ch. (80) Number, and the Secondary Ch. (160) Number store one each of the information used to identify the secondary channels of the respective frequency band widths. However, this is non-limiting. For example, a plurality of pieces of information used to identify the secondary channel may be stored in all or a part of the Secondary Ch. (20) Number, the Secondary Ch. (40) Number, the Secondary Ch. (80) Number, and the Secondary Ch. (160) Number. Further, a part of the Secondary Ch. (20) Number, the Secondary Ch. (40) Number, the Secondary Ch. (80) Number, and the Secondary Ch. (160) Number may be omitted, or a channel other than these frequency band widths may be indicated as the secondary channel.

The Channel Usage Map is information used to identify a channel that can be used (or a channel that is not used) in the BSS 10. That is, the Channel Usage Map is utilized to inform a range defined as an operable channel in that country or region in accordance with a global position in which the AP 100 forming the BSS 10 is placed. For example, FIG. 7 illustrates Channel Usage Map used to identify a channel that can be used (or a channel that is not used) as a secondary channel of 20 [MHz]. Bit 0 indicates a channel 4, bit 1 indicates a channel 8, and bit 2 indicates a channel 12. In this way, bits are allocated in order starting from the channel of the lower frequency band, and bits up to bit 63 indicating a channel 256 are arranged. Further, on the basis of which value of 0 and 1 is stored in each bit, the channel that can be used (or the channel that is not used) as the secondary channel is identified. The Channel Usage Map basically includes information of a width of 20 [MHz]. However, the Channel Usage Map may include information regarding another frequency band width on an as-needed basis. For example, FIGS. 8 to 10 illustrate Channel Usage Maps used to identify a channel that can be used (or a channel that is not used) for the secondary channels of 40, 80, and 160 [MHz], respectively. In the present embodiment, it is assumed that each of the Channel Usage Maps illustrated in FIGS. 7 to 10 is stored in the channel notification signal. However, depending on the frequency band width of the secondary channel indicated in the channel notification signal, the combination of the Channel Usage Maps stored in the channel notification signal can be flexibly changed.

Next, referring to FIG. 11, the Announce Type will be described in more detail. For example, as illustrated in FIG. 11, any one of numerical values of 0 to 4 is stored in the Announce Type. The numerical value 0 indicates that the channel notification signal in which it is stored is a signal transmitted to the STA 200 from the AP 100 belonging to the same BSS 10. For example, when the AP 100 notifies the STA 200 of the frequency bands of the primary channel and the secondary channel used in its own BSS 10, the numerical value 0 is stored in the Announce Type.

The numerical value 1 indicates that the channel notification signal in which it is stored is a signal transmitted to the AP 100 from the STA 200 belonging to the same BSS 10. For example, when the STA 200 reports to the AP 100 that the setting of the frequency bands of the primary channel and the secondary channel has been completed, the numerical value 1 is stored in the Announce Type.

The numerical value 2 indicates that channel notification signal in which it is stored is a signal transmitted from the STA 200 to the wireless communication apparatus belonging to the OBSS. For example, when the STA 200 determines whether or not transmission of the channel notification signal is necessary on the basis of presence or absence of a neighboring OBSS or the like and transmits the channel notification signal to the wireless communication apparatus belonging to the OBSS as appropriate, the numerical value 2 is stored in the Announce Type.

The numerical value 3 indicates that the channel notification signal in which it is stored is a signal transmitted from the STA 200 receiving the channel notification signal from the AP 100 belonging to the OBSS to the AP 100 belonging to its own BSS 10. For example, when the STA 200 reports the frequency bands of the primary channel and the secondary channel used in the OBSS to its own AP 100, the numerical value of 3 is stored in the Announce Type.

The numerical value 4 indicates that the channel notification signal in which it is stored is a signal transmitted from the STA 200 receiving the channel notification signal from the STA 200 belonging to the OBSS to the AP 100 belonging to its own BSS 10. For example, when the STA 200 reports the frequency bands of the primary channel and the secondary channel used in the OBSS to its own AP 100, the numerical value of 4 is stored in the Announce Type.

By distinguishing the numerical values 3 and 4 described above from each other, the AP 100 is allowed to recognize (or estimate) a positional relationship with respect to the wireless communication apparatus belonging to the OBSS. For example, in a case where the numerical value 3 is stored in the Announce Type, the AP 100 is allowed to recognize that the AP 100 of the OBSS is positioned in a region in which it can communicate with the STA 200 belonging to its own BSS 10. Further, in a case where the numerical value 4 is stored in the Announce Type, the AP 100 is allowed to recognize that only the STA 200 of the OBSS is positioned in the region in which it can communicate with the STA 200 belonging to its own BSS 10, and the AP 100 of the OBSS is not positioned therein. By being allowed to recognize the positional relationship with respect to the wireless communication apparatus belonging to the OBSS, the AP 100 is allowed to appropriately adjust the size of the channel band width to be used, etc. For example, in a case where a separation distance between the AP 100 and the AP 100 of the OBSS is relatively far (for example, in a case where the numerical value 4 is stored in the Announce Type), the AP 100 may increase the size of the channel band width to be used (particularly, for downlink communication). Further, in a case where the separation distance between the AP 100 and the AP 100 of the OBSS is relatively close (for example, in a case where the numerical value 3 is stored in the Announce Type), the AP 100 may conversely reduce the size of the channel band width to be used (particularly for uplink communication).

Although the configuration examples of the channel notification signal have been described above with reference to FIGS. 6 to 11, the configuration of the channel notification signal is not limited to the examples described above. For example, the channel notification signal may not necessarily include the above-described information. Conversely, the channel notification signal may include information not described above. Further, the region in the channel notification signal in which the various types of information described above are stored is not particularly limited. For example, the information included in the Header part in the above may be included in the Payload part. Conversely, the information included in the Payload part in the above may be included in the Header part.

2.3. Examples of Functional Configuration

In the above description, the examples of the configuration of the channel notification signal communicated in the wireless LAN system according to the present embodiment have been described. Next, referring to FIGS. 12 to 14, examples of functional configurations of the AP 100 and the STA 200 in the wireless LAN system according to the present embodiment will be described.

(Examples of Functional Configurations of AP 100 and STA 200)

Figure 12:
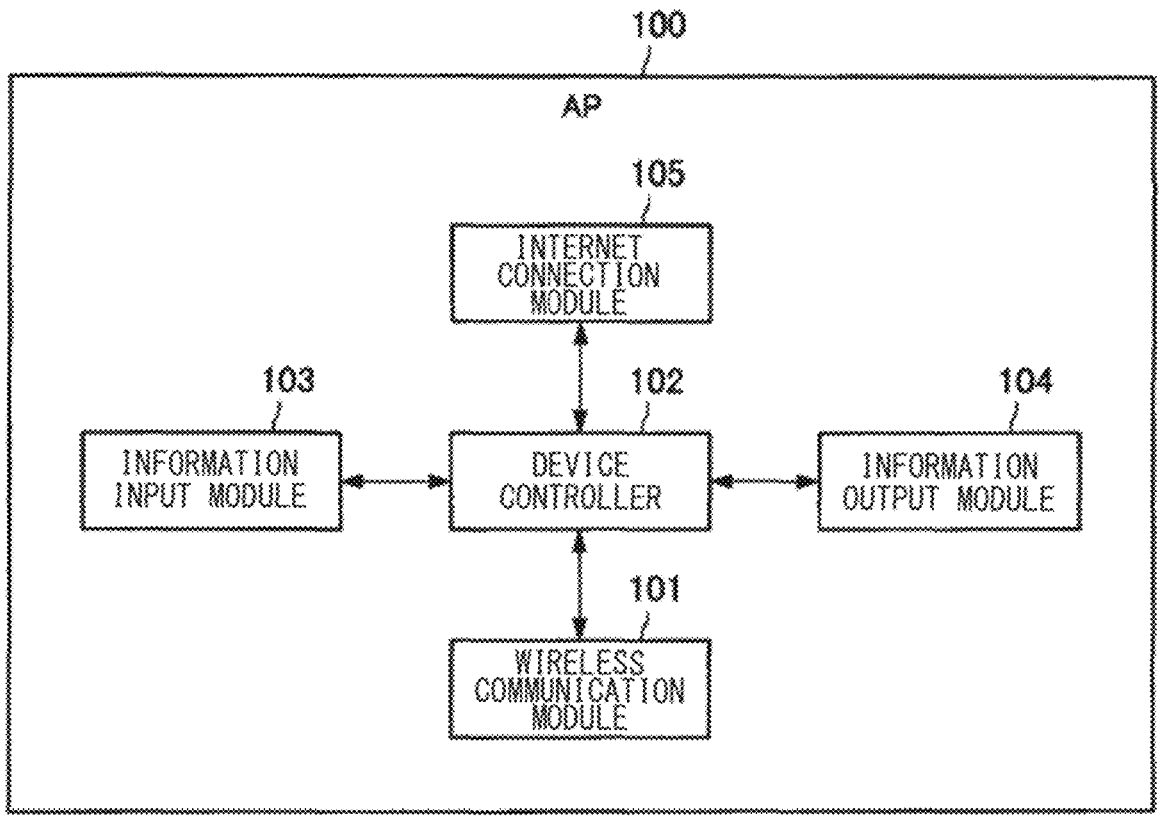
FIG. 12 is a block diagram illustrating an example of a functional configuration of the AP 100.

First, referring to FIGS. 12 and 13, examples of functional configurations of the AP 100 and the STA 200 will be described. FIG. 12 is a block diagram illustrating an example of a functional configuration of the AP 100. As illustrated in FIG. 12, the AP 100 includes a wireless communication module 101, a device controller 102, an information input module 103, an information output module 104, and an Internet connection module 105.

The wireless communication module 101 achieves wireless communication with another wireless communication apparatus. An example of a functional configuration of the wireless communication module 101 will be described later.

The device controller 102 comprehensively controls overall processes performed by the AP 100. For example, the device controller 102 controls initiation and termination of the processes of the respective functional configurations on the basis of input information provided from the information input module 103. Note that a content of the control of the device controller 102 is not particularly limited. For example, the device controller 102 may control a process (for example, a process related to an OS (Operating System), etc.) typically performed in a general purpose computer, a PC (Personal Computer), a tablet PC, a smartphone, or the like.

The information input module 103 acquires user input. For example, the information input module 103 includes an input mechanism such as a touch panel, a button, or a keyboard. In a case where the user performs various types of operation on these input mechanisms, the information input module 103 generates input information on the basis of the operation, and provides input information to the device controller 102. Note that the input mechanism of the information input module 103 and a content of the input are not particularly limited.

The information output module 104 controls various outputs. For example, the information output module 104 includes an output mechanism such as a display (for example, a liquid crystal display, an organic EL display, or the like), a speaker, or a lamp. The information output module 104 displays various types of information (for example, an operation state of each wireless communication apparatus, information obtained through the Internet, etc.) on a display, or outputs various sounds through a speaker in accordance with the process results of each functional configuration and the like. Note that the output mechanism of the information output module 104 and a content of the output are not particularly limited.

The Internet connection module 105 allows the AP 100 to connect to the Internet. For example, the Internet connection module 105 has a function such as a modem that can be connected to the Internet.

Figure 13:
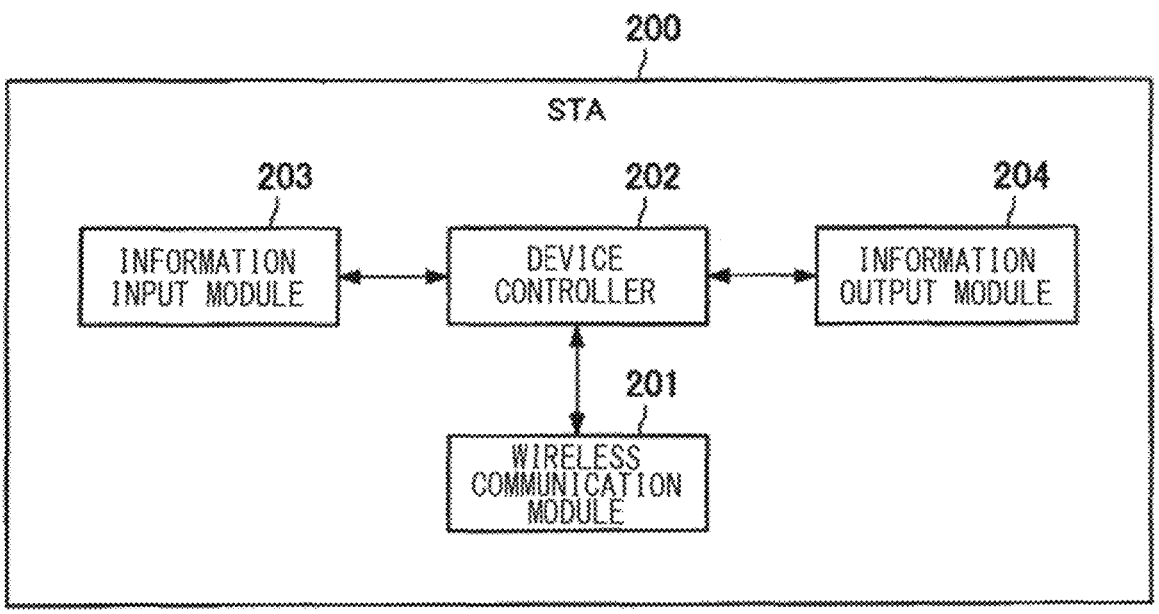
FIG. 13 is a block diagram illustrating an example of a functional configuration of the STA 200.

FIG. 13 is a block diagram illustrating an example of the functional configuration of the STA 200. As illustrated in FIG. 13, the STA 200 includes a wireless communication module 201, a device controller 202, an information input module 203, and an information output module 204. Each functional configuration other than that of the wireless communication module 201 can be similar to the functional configuration of the AP 100 described referring to FIG. 12, and thus a description thereof is omitted.

(Examples of Functional Configuration of Wireless Communication Module)

Figure 14:
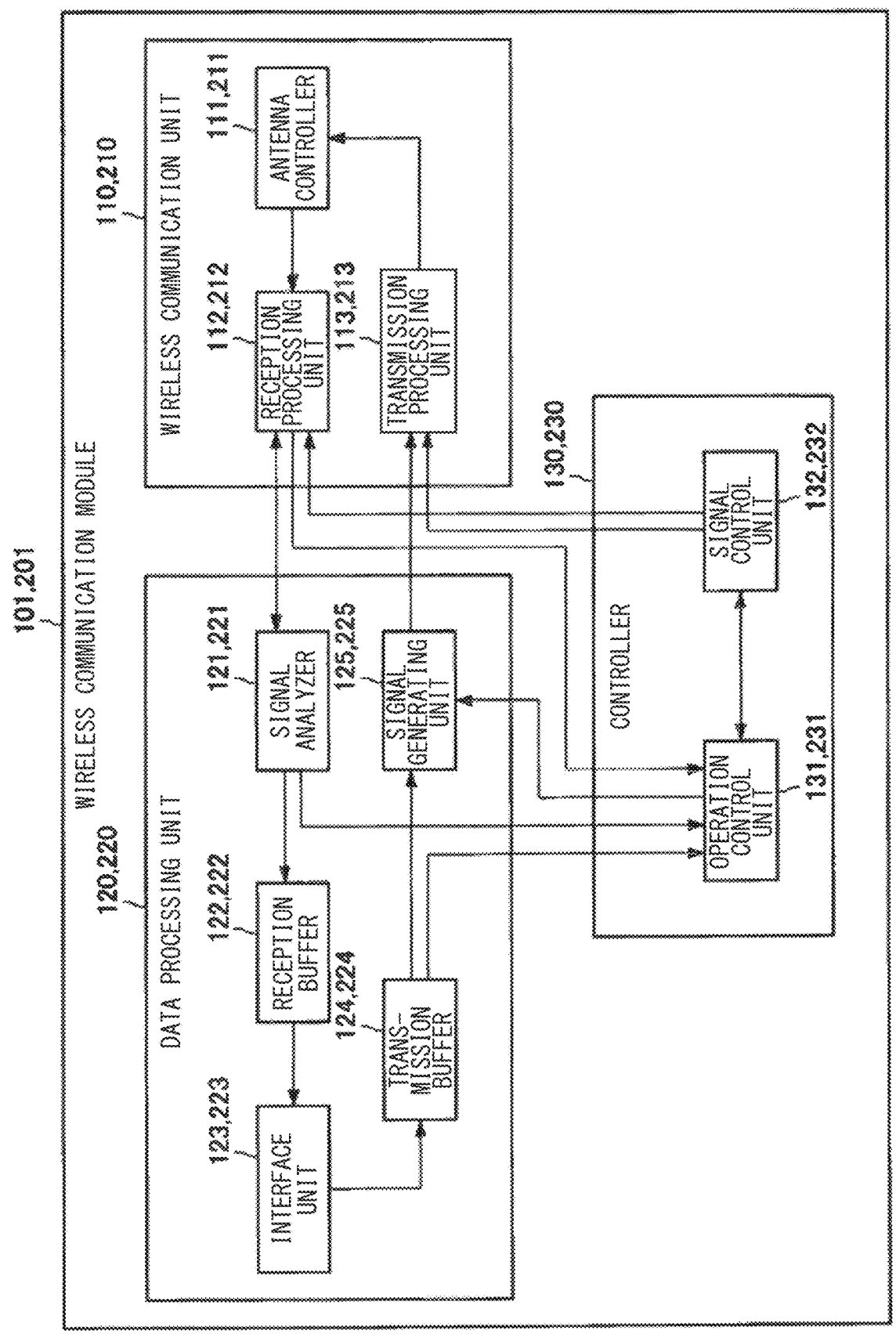
FIG. 14 is a block diagram illustrating an example of a functional configuration of a wireless communication module 101 of the AP 100 and a wireless communication module 201 of the STA 200.

Next, referring to FIG. 14, an example of functional configurations of the wireless communication module 101 of the AP 100 and the wireless communication module 201 of the STA 200 will be described. FIG. 14 is a block diagram illustrating an example of functional configurations of the wireless communication module 101 and the wireless communication module 201. In the following, the example of the functional configuration of the wireless communication module 101 is basically described, and regarding the wireless communication module 201, only functions that differ from those of the wireless communication module 101 are described.

As illustrated in FIG. 14, the wireless communication module 101 includes a wireless communication unit 110, a data processing unit 120, and a controller 130. The wireless communication unit 110 includes an antenna controller 111, a reception processing unit 112, and a transmission processing unit 113. The data processing unit 120 includes a signal analyzer 121, a reception buffer 122, an interface unit 123, a transmission buffer 124, and a signal generating unit 125. The controller 130 includes an operation control unit 131 and a signal control unit 132.

The antenna controller 111 controls transmission and reception of a signal (such as the channel notification signal) via at least one antenna. More specifically, the antenna controller 111 provides a signal received via the antenna to the reception processing unit 112, and transmits, via the antenna, a signal generated by the transmission processing unit 113.

The reception processing unit 112 uses the signal provided from the antenna controller 111 to perform a reception process of the frame. For example, the reception processing unit 112 performs an analog process and down-conversion on the signal obtained from the antenna to output a baseband reception signal. Further, the reception processing unit 112 calculates correlation between a predetermined signal pattern and the reception signal while shifting the reception signal to be calculated on the time axis, and detects a preamble on the basis of appearance of a peak of the correlation. Thereby, the reception processing unit 112 is allowed to detect the channel notification signal or the like. Further, the reception processing unit 112 demodulates and decodes the baseband reception signal to acquire a frame. The reception processing unit 112 provides the acquired frame to the signal analyzer 121.

The transmission processing unit 113 performs a transmission process of a transmission frame provided from the signal generating unit 125. More specifically, the transmission processing unit 113 generates a transmit signal on the basis of the frame provided by the signal generating unit 125 and a parameter set by an instruction from the signal control unit 132. For example, the transmission processing unit 113 encodes, interleaves, and modulates the frame provided from the signal generating unit 125 in accordance with coding and modulation schemes, etc. instructed by the signal control unit 132. Thereby, the transmission processing unit 113 generates a baseband transmission signal. Further, the transmission processing unit 113 performs up-conversion on the baseband transmission signal obtained by the previous process.

The signal analyzer 121 analyzes the reception frame and acquires various types of information. More specifically, the signal analyzer 121 analyzes various types of information included in the Header part and the Payload part of the received channel notification signal, and acquires the various types of information. Further, for example, the signal analyzer 121 determines whether or not the channel notification signal is a signal addressed to the own apparatus, on the basis of the Receive Address.

The reception buffer 122 stores information included in the received frame and acquired by the signal analyzer 121. The stored information and a storing period are not particularly limited.

The interface unit 123 is an interface connected to the device controller 102 of the AP 100. More specifically, the interface unit 123 receives, from the device controller 102, information to be transmitted, and provides the received information to the device controller 102.

The transmission buffer 124 stores information that is provided from the interface unit 123 or the like and that is to be transmitted. The stored information and a storing period are not particularly limited.

The signal generating unit 125 constructs a transmission frame. For example, the signal generating unit 125 generates a channel notification signal that includes information regarding the primary channel and the secondary channel on the basis of the control by the operation control unit 131. Note that the transmission frame generated by the signal generating unit 125 is not limited to the channel notification signal.

The operation control unit 131 performs a process related to the setting of the primary channel and the secondary channel. For example, the operation control unit 131 performs a process related to scanning of a channel usage status. More specifically, the operation control unit 131 configures various settings (for example, a target channel, a threshold related to reception electric power, a scanning time, etc.) related to the scanning of the channel usage status, and controls initiation and termination of the scanning. Further, in a case where the reception processing unit 112 detects a signal equal to or higher than the predetermined reception electric power within the scanning time, the operation control unit 131 stores a detection result of the signal as the channel usage status. Thereby, the operation control unit 131 manages a plurality of channels.

Further, the operation control unit 131 determines whether or not setting (changing) of the primary channel and the secondary channel is necessary. For example, when the AP 100 is started, the operation control unit 131 determines that the setting of the primary channel and the secondary channel is necessary, in a case where the scanning of the channel usage status is completed, in a case where the channel notification signal notifying the primary channel and the secondary channel of the OBSS is received, in a case where the frequency of occurrence of communication errors increases, or the like. Note that the method of determining whether or not the setting of the primary channel and the secondary channel is necessary is not limited to them. For example, in a case where a screen indicating whether or not setting of the used channel is necessary is displayed on a communication terminal connected to the AP 100, and the user instructs the setting of the used channel on an as-needed basis, the operation control unit 131 may determine that the setting of the primary channel and the secondary channel is necessary.

In a case where the operation control unit 131 determines that the setting of the primary channel and the secondary channel is necessary, the operation control unit 131 sets the primary channel and the secondary channel on the basis of the result of the scanning of the channel usage status or the like. More specifically, the operation control unit 131 sets the primary channel and the secondary channel so that the frequency bands used in the respective BSSs 10 do not overlap as much as possible, as in the method described with reference to FIG. 4. The setting of the secondary channel is described. The operation control unit 131 determines, for example, the frequency bands (for example, 20, 40, 80, 160 [MHz], etc.) of a plurality of secondary channels having band widths different from each other. Further, the operation control unit 131 determines the priorities of the use of the plurality of secondary channels (for example, the operation control unit 131 determines the priorities to be higher in the order of 20, 40, 80, and 160 [MHz]). Thereafter, the operation control unit 131 reflects, in the Channel Usage Map, the channel that can be used in its own BSS 10.

Note that the content of the process performed by the operation control unit 131 is not limited to the above. For example, the operation control unit 131 is allowed to perform various processes for comprehensively controlling the wireless communication by the AP 100.

Meanwhile, the process of the operation control unit 231 of the STA 200 will be described. In a case where a channel notification signal (a signal including information regarding a channel used in the BSS 10) is received from the AP 100, the operation control unit 231 sets the frequency bands of the primary channel and the secondary channel used in the BSS 10 on the basis of the information regarding the channel used in the BSS 10 included in the signal. Further, the operation control unit 231 reflects in (sets) the Channel Usage Map on the basis of the information regarding the channel used in the BSS 10 included in the signal. Further, the operation control unit 231 determines whether or not the channel notification to the external apparatus is necessary. For example, in a case where at least a part of the OBSS is present in the communication range of the own apparatus, the operation control unit 231 determines that the channel notification to the external apparatus belonging to the OBSS is necessary. Note that the method of determining whether or not the channel notification to the external apparatus is necessary is not limited to this.

The signal control unit 132 controls the transmission and reception process by the wireless communication unit 110. More specifically, the signal control unit 132 controls various parameters for transmission and reception by the wireless communication unit 110 on the basis of the instruction of the operation control unit 131. For example, the signal control unit 132 controls a parameter such as the channel used in transmission of the channel notification signal by the transmission processing unit 113.

The examples of the functional configuration of the AP 100 and the STA 200 have been described above. However, the functional configurations of the AP 100 and the STA 200 are not limited to the examples illustrated in FIGS. 12 to 14. For example, the AP 100 or the STA 200 may not necessarily include all of the functional configurations illustrated in FIGS. 12 to 14, or may include a functional configuration other than those functional configurations.

2.4. Examples of Process Flow

In the above, the examples of the functional configurations of the AP 100 and the STA 200 in the wireless LAN system have been described. Next, an example of a process flow of each apparatus will be described.

(Scanning of Channel Usage Status)

Figure 15:
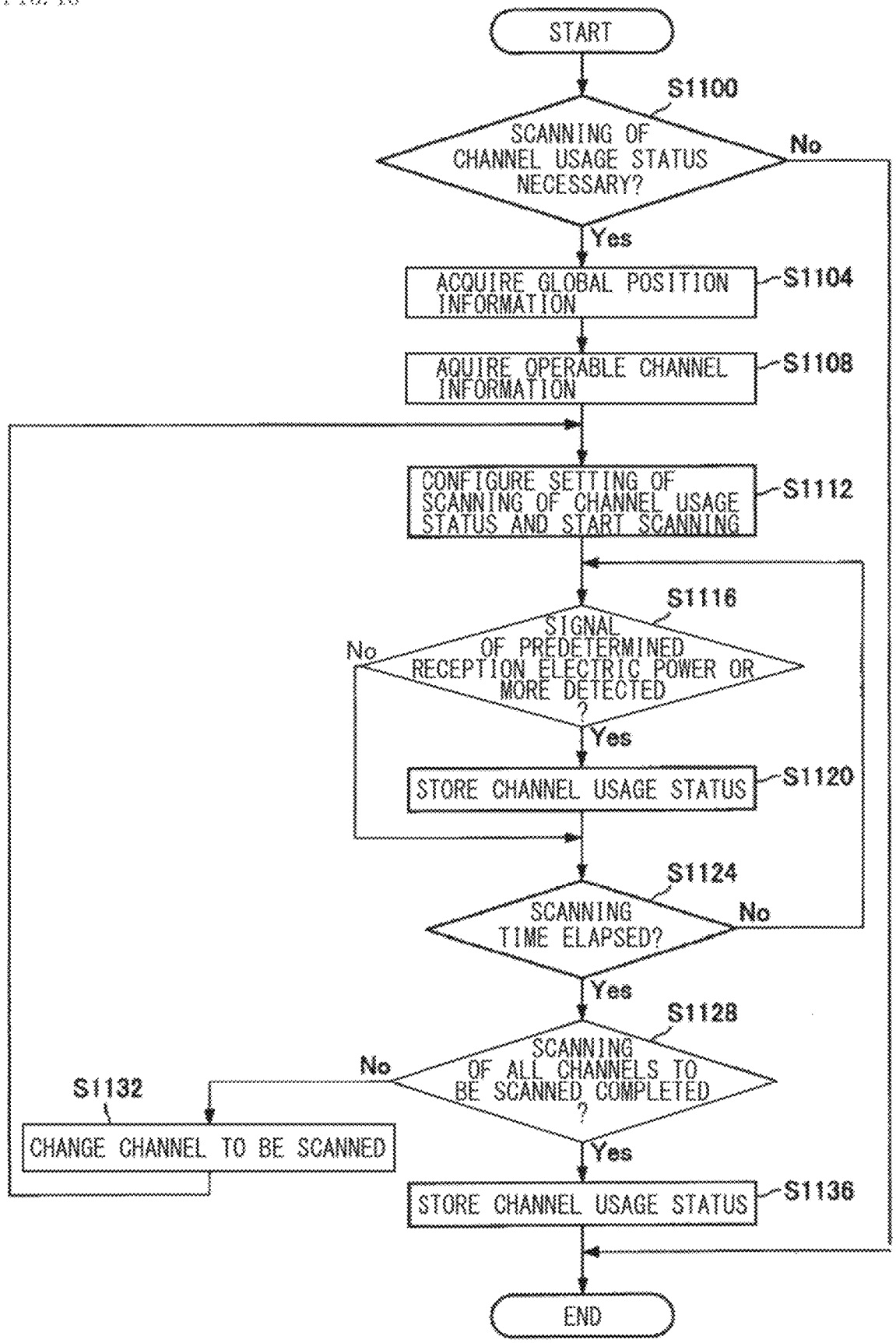
FIG. 15 is a flowchart illustrating an example of a process of scanning a channel usage status.

First, referring to FIG. 15, scanning of the channel usage status will be described. This process is a process performed on an as-needed basis, for example, before the AP 100 sets the primary channel and the secondary channel in its own BSS 10.

In step S1100, the operation control unit 131 of the AP 100 determines whether or not the scanning of the channel usage status is necessary. For example, the operation control unit 131 determines that the scanning of the channel usage status is necessary in a case where a screen indicating whether or not the setting of the used channel is necessary is displayed on a communication terminal connected to the AP 100 and the user instructs to set the used channel on an as-needed basis, in a case where a surrounding communication environment changes (for example, in a case where an OBSS is newly detected or the OBSS is no longer detected), etc. In a case where the operation control unit 131 determines that the scanning of the channel usage status is not necessary (step S1100/No), the subsequent processes are not performed. In a case where the operation control unit 131 determines that the scanning of the channel usage status is necessary (step S1100/Yes), in step S1104, the operation control unit 131 acquires global position information (latitude, longitude, altitude, etc.) of its own apparatus at the time of the process. For example, the operation control unit 131 acquires the global position information by analyzing sensor information from a position sensor provided in its own apparatus, or acquires the global position information from the external apparatus via a network. In step S1108, operable channel information is acquired on the basis of the global position information acquired by the operation control unit 131. For example, the operation control unit 131 identifies the country or region in which the own apparatus is positioned by referring to a particular data base on the basis of the global position information, and acquires a list of channels operable in the country or region as operable channel information.

In step S1112, the operation control unit 131 configures various settings of the scanning (for example, a channel, a threshold related to reception electric power, a scanning time, etc.) in order to grasp the usage status of the channel in the operable channel, and starts the scanning.

More specifically, in a case where the reception processing unit 112 detects a signal equal to or higher than a predetermined reception electric power within the scanning time (step S1116/Yes), in step S1120, the operation control unit 131 temporarily stores the detection result of the signal as the usage status of the channel. Note that, in a case where the signal equal to or higher than the predetermined reception electric power is not detected by the reception processing unit 112 (step S1116/No), the process in step S1120 is not performed. Scanning of a certain channel is performed until the scanning time elapses. In a case where the scanning time has elapsed (step S1124/Yes), and the scanning of all of the channels to be scanned has not been completed yet (step S1128/No), the operation control unit 131 changes the channel to be scanned in step S1132, and the processes in step S1112 to step S1124 are performed again. In a case where the scanning of all of the channels to be scanned is completed (step S1128/Yes), the operation control unit 131 stores the usage status of the channel in step S1136. This brings the series of processes to an end.

(Channel Setting Process)

Figure 16:
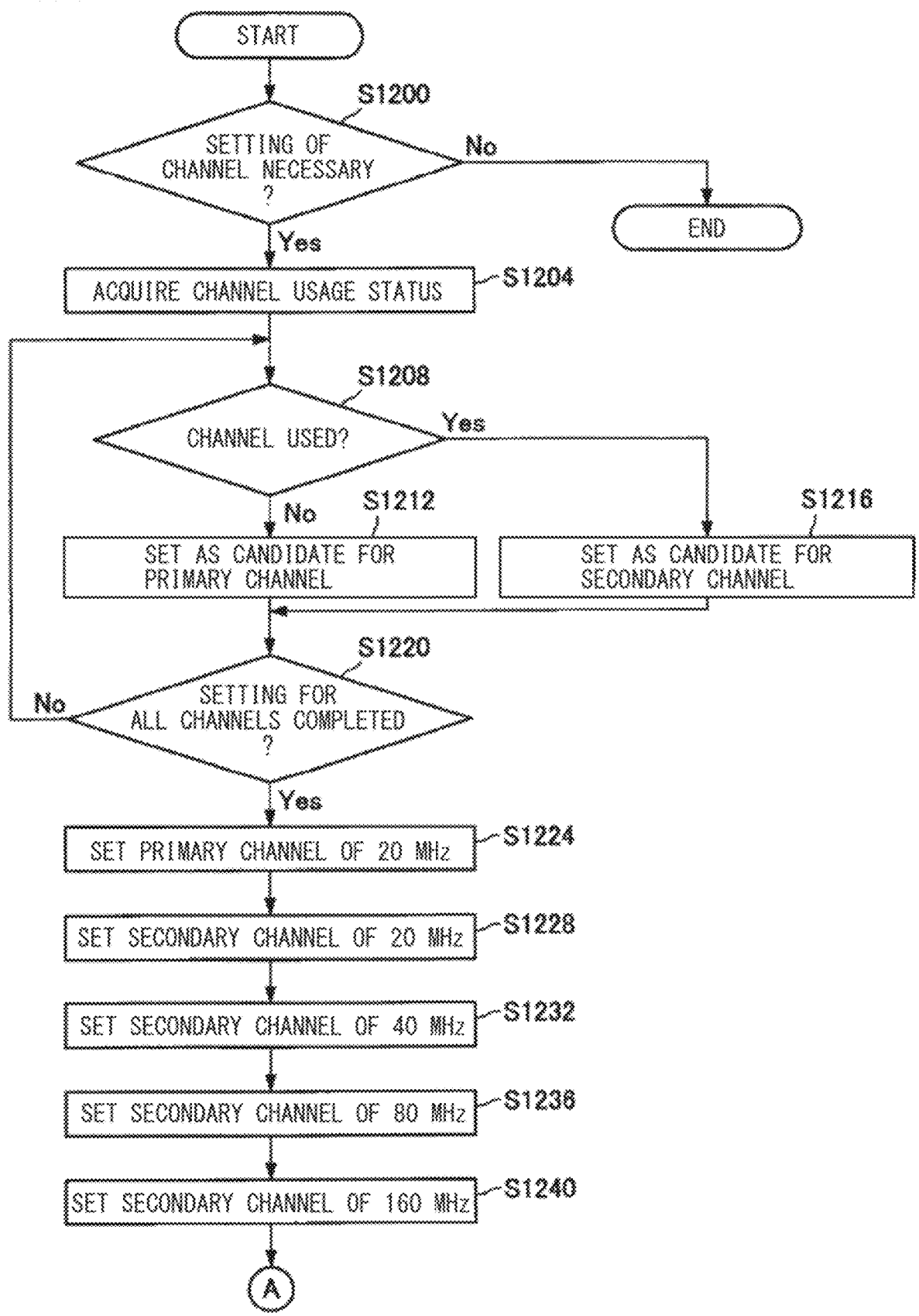
FIG. 16 is a flowchart illustrating an example of a channel setting process.
Figure 17:
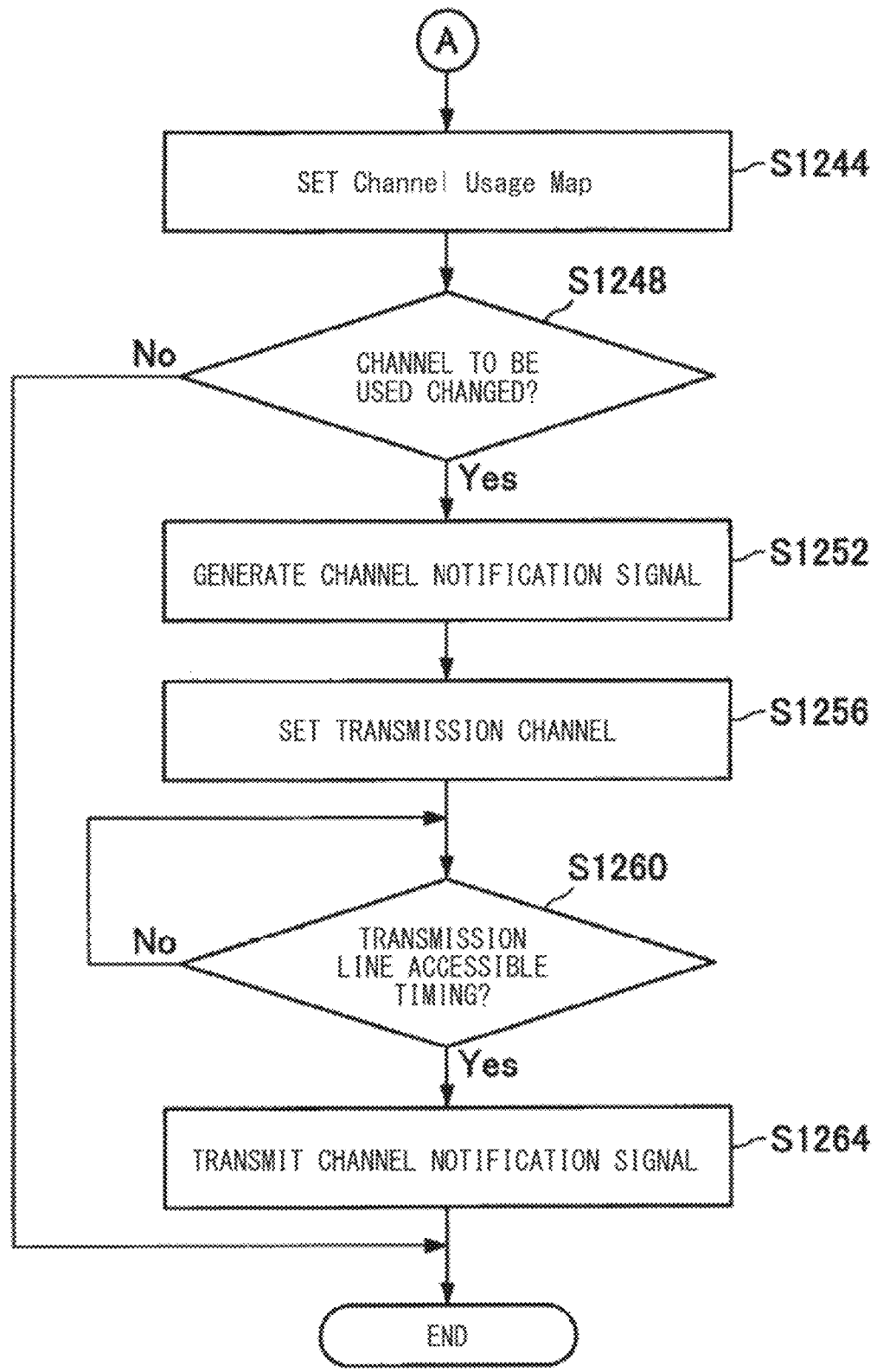
FIG. 17 is a flowchart illustrating an example of the channel setting process.

Next, referring to FIGS. 16 and 17, a channel setting process will be described. The process is a process in which, for example, the AP 100 sets the primary channel and the secondary channel in its own BSS 10.

In step S1200, the operation control unit 131 of the AP 100 determines whether or not the setting (changing) of the primary channel and the secondary channel is necessary. For example, when the AP 100 is started, the operation control unit 131 determines that the setting of the primary channel and the secondary channel is necessary in a case where the scanning of the channel usage status is completed, in a case where the channel notification signal notifying the primary channel and the secondary channel of the OBSS is received, in a case where the frequency of occurrence of communication errors increases, etc. In a case where the operation control unit 131 determines that the setting of the primary channel and the secondary channel is not necessary (step S1200/No), the subsequent processes are not performed. In a case where the operation control unit 131 determines that the setting of the primary channel and the secondary channel is necessary (step S1200/Yes), in step S1204, the operation control unit 131 acquires the channel usage status obtained by the process in FIG. 15.

In step S1208, the operation control unit 131 selects one channel from the channels included in the channel usage status, and determines whether or not the channel is used in another BSS 10. In a case where the channel is not used in the other BSS 10 (step S1208/No), in step S1212, the operation control unit 131 sets the channel as a candidate for the primary channel. In contrast, in a case where the channel is used in another BSS 10 (step S1208/Yes), in step S1216, the operation control unit 131 sets the channel as a candidate for the secondary channel. The operation control unit 131 configures setting as a candidate for the primary channel or a candidate for the secondary channel for all of the channels included in the channel usage status (in other words, processes in step S1208 to step S1216 are performed for all of the channels included in the channel usage status).

In a case where the setting as the candidate for the primary channel or the candidate for the secondary channel is configured for all of the channels included in the channel usage status (step S1220/Yes), in step S1224, the operation control unit 131 sets a primary channel of 20 [MHz]. For example, as described referring to FIG. 4, the operation control unit 131 sets, as the primary channel of 20 [MHz], that having the frequency band which is the farthest from the primary channel used in the OBSS and is unlikely to be used among the candidates for the primary channel. In step S1228 to step S1240, the operation control unit 131 sets the secondary channel from 20 [MHz] to 160 [MHz]. For example, the operation control unit 131 sets the secondary channel in a direction opposite to the OBSS regarding the frequency (that is, the secondary channel that is unlikely to be used in the OBSS as much as possible), as described with reference to FIG. 4.

In step S1244, the operation control unit 131 sets the Channel Usage Map. That is, the operation control unit 131 reflects, in the Channel Usage Map, the channel that can be used in its own BSS 10. Further, in a case where the channel to be used (the primary channel or the secondary channel) is changed before or after the setting (step S1248/Yes), in step S1252, the signal generating unit 125 generates a channel notification signal including information regarding the changed channel on the basis of the control by the operation control unit 131. In step S1256, the transmission processing unit 113 sets the channel used for transmission of the channel notification signal on the basis of the control by the signal control unit 132.

In step S1260, the transmission processing unit 113 reserves the transmission of the channel notification signal until the signal control unit 132 determines that it has become the timing at which the transmission line is accessible. In a case where the signal control unit 132 determines that it has become the timing at which the transmission line is accessible (step S1260/Yes), in step S1264, the transmission processing unit 113 transmits the channel notification signal. This brings the series of processes to an end. Note that, in a case where the channel to be used (the primary channel or the secondary channel) is not changed in step S1248 (step S1248/No), the processes from step S1252 to step S1264 are not performed, and the series of processes is brought to the end.

(Channel Reflection Process)

Figure 18:
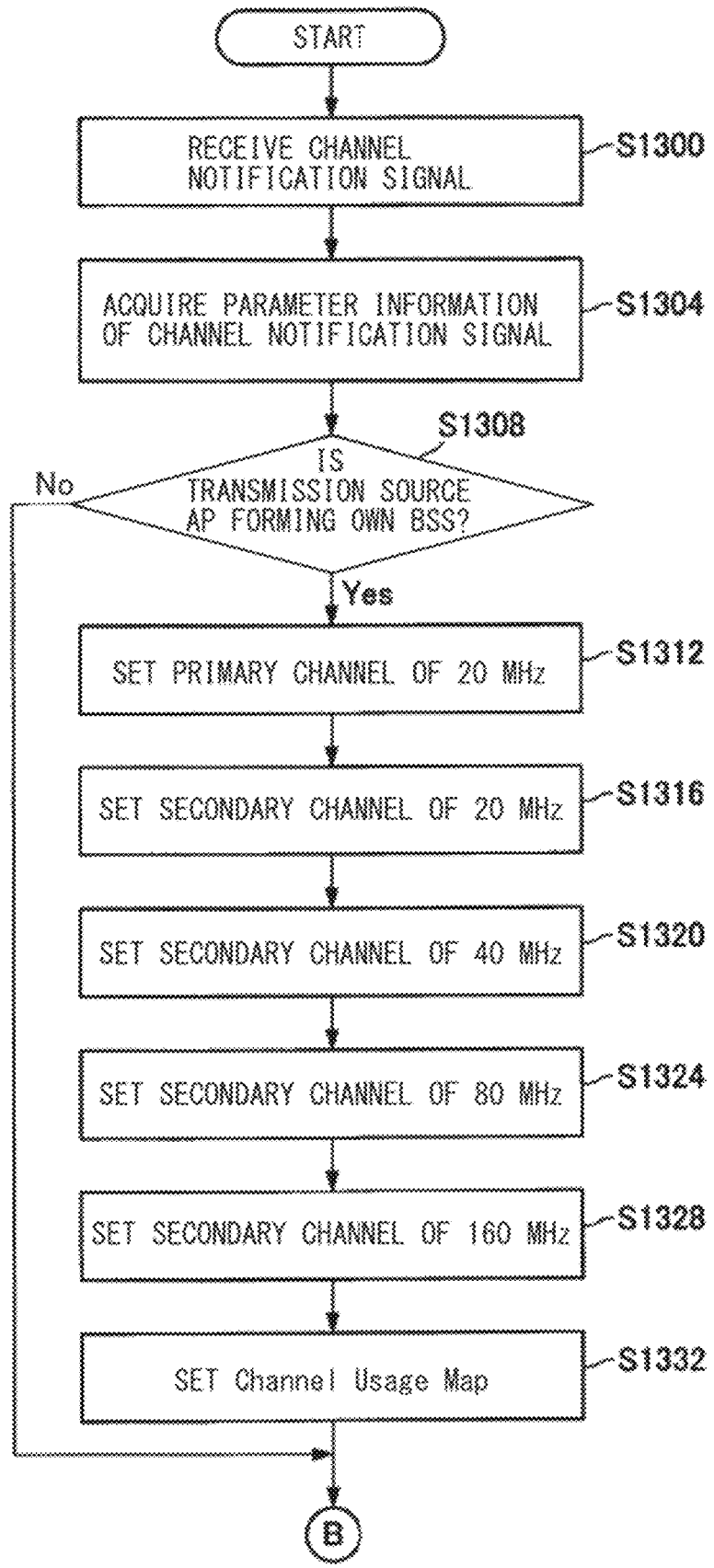
FIG. 18 is a flowchart illustrating an example of a channel reflection process.
Figure 19:
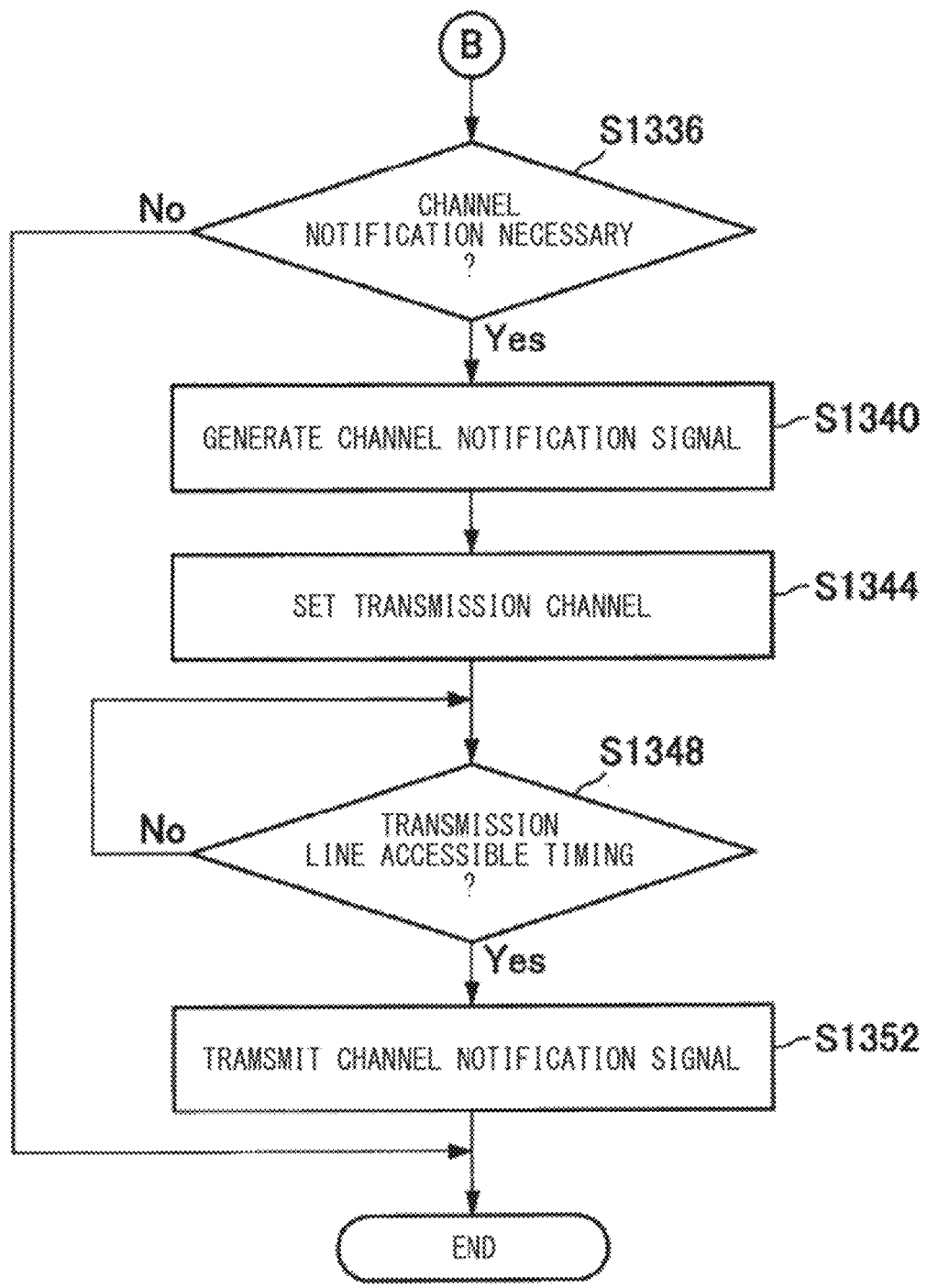
FIG. 19 is a flowchart illustrating an example of the channel reflection process.

Next, referring to FIGS. 18 and 19, a channel reflection process will be described. The process is a process in which, for example, the STA 200 sets the primary channel and the secondary channel on the basis of the channel notification signal from the AP 100.

In step S1300, the reception processing unit 212 of the STA 200 receives the channel notification signal. Thereafter, the signal analyzer 221 acquires parameter information included in the Header part of the channel notification signal or the like in step S1304, and determines, in step S1308, whether or not the transmission source of the channel notification signal is the AP 100 forming its own BSS 10 on the basis of the parameter information.

In a case where the signal analyzer 221 determines that the transmission source of the channel notification signal is the AP 100 forming its own BSS 10 (step S1308/Yes), the operation control unit 231 reflects (sets) the primary channel of 20 [MHz] and the secondary channel of 20 [MHz] to 160 [MHz] indicated in the channel notification signal in step S1312 to step S1328. In step S1332, the operation control unit 231 reflects (sets) the Channel Usage Map included in the channel notification signal. Note that, in a case where the signal analyzer 221 determines that the transmission source of the channel notification signal is not the AP 100 forming its own BSS 10 in step S1308 (step S1308/No), the processes in step S1312 to step S1332 are not performed.

In step S1336, the operation control unit 231 determines whether or not the channel notification to the external apparatus is necessary. For example, in a case where the transmission source of the channel notification signal received in step S1300 is the AP 100 forming its own BSS 10, and at least a part of the OBSS is present in the communication range of its own apparatus, the operation control unit 231 determines that channel notification (notification of the channel of its own BSS 10) to the wireless communication apparatus of the OBSS is necessary. Further, in a case where the transmission source of the channel notification signal received in step S1300 is the wireless communication apparatus belonging to the OBSS, the operation control unit 231 determines that the channel notification (notification of the channel of the OBSS) to the AP 100 forming its own BSS 10 is necessary. In a case where the operation control unit 231 determines that the channel notification to the external apparatus is necessary (step S1336/Yes), in step S1340, the signal generating unit 225 generates a channel notification signal (a signal including information regarding the channel used in the BSS 10) on the basis of the control by the operation control unit 231. In step S1344, the transmission processing unit 213 sets the channel used for transmission of the channel notification signal on the basis of the control by the signal control unit 232.

In step S1348, the transmission processing unit 213 reserves the transmission of the channel notification signal until the signal control unit 232 determines that it has become the timing at which the transmission line is accessible. In a case where the signal control unit 232 determines that it has become the timing at which the transmission line is accessible (step S1348/Yes), in step S1352, the transmission processing unit 213 transmits the channel notification signal to the external apparatus belonging to the OBSS or the AP 100 forming its own BSS 10. Thereby, the series of processes is brought to an end. Note that, in a case where the operation control unit 231 determines that the channel notification to the external apparatus is not necessary in step S1336 (step S1336/No), the processes from step S1340 to step S1352 are not performed, and the series of processes is brought to an end.

Note that each step in the flowcharts described with reference to FIGS. 15 to 19 need not necessarily be processed in time series in the described order. That is, the steps in the flowcharts may be processed in an order different from the described order, or may be processed in parallel.

3. APPLICATION EXAMPLES

The technology according to the present disclosure is applicable to various products. For example, the STA 200 may be implemented as a smart phone, a tablet PC (Personal Computer), a laptop PC, a mobile terminal, a television receiver, a printer, a fixed terminal, or an on-vehicle terminal. The mobile terminal is, for example, a portable game terminal, a digital camera, or the like. The fixed terminal is, for example, a digital scanner, a network storage, or the like. The on-vehicle terminal is, for example, a car navigation apparatus or the like. Further, the STA 200 may be implemented as a terminal (also referred to as an MTC (Machine Type Communication) terminal) that performs M2M (Machine To Machine) communication such as a smart meter, a vending machine, a remote monitoring apparatus, or a POS (Point Of Sale) terminal. Further, the STA 200 may be a wireless communication module (for example, an integrated circuit module including a single die) mounted on these terminals.

Meanwhile, for example, the AP 100 may be implemented as a wireless LAN access point (also called a wireless base station) having a router function or a wireless LAN access point having no router function. Further, the AP 100 may be implemented as a mobile wireless LAN router. Further, the AP 100 may be a wireless communication module (for example, an integrated circuit module including a single die) mounted on these apparatuses.

3.1. First Application Example

Figure 20:
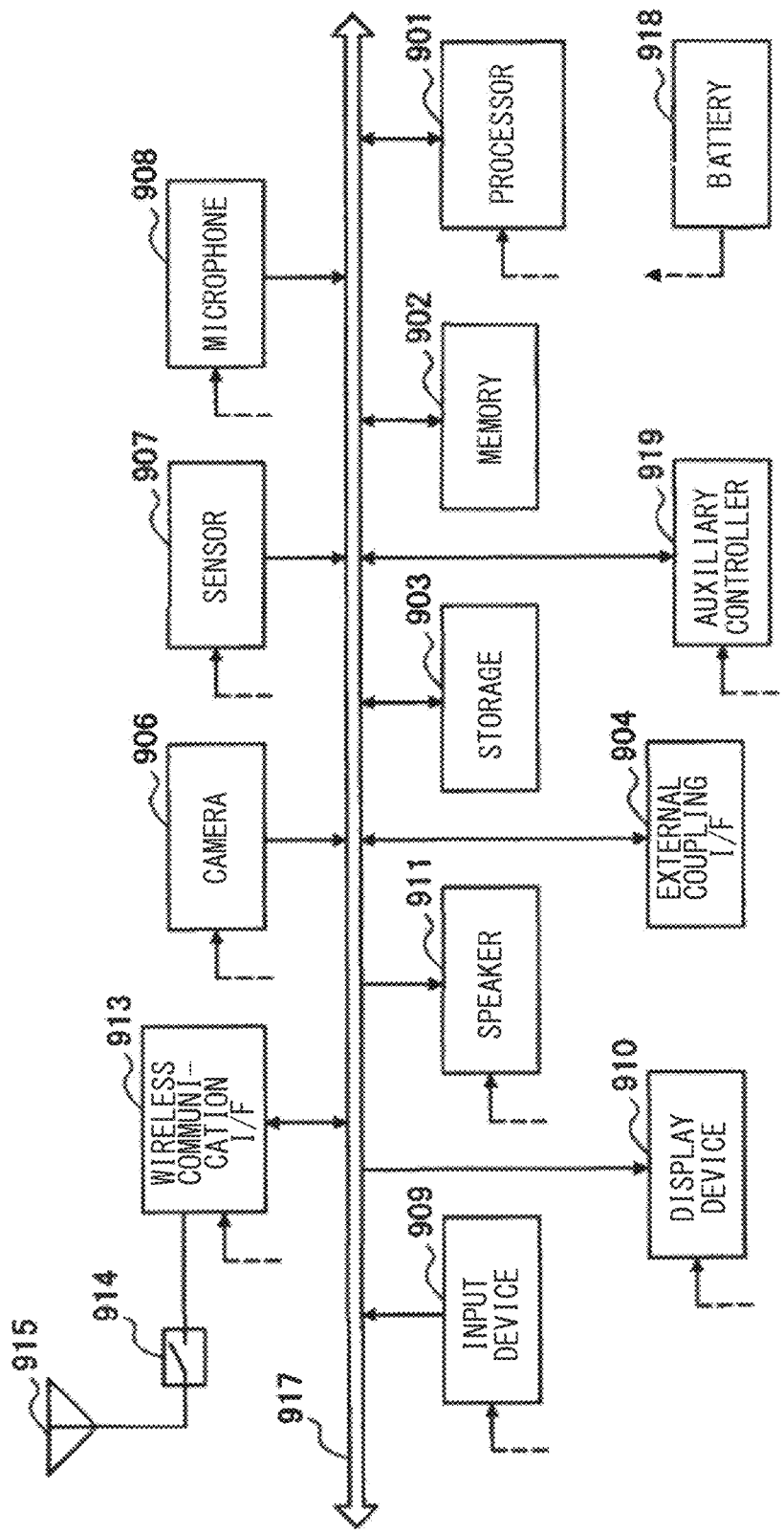
FIG. 20 is a block diagram illustrating an example of a schematic configuration of a smartphone.

FIG. 20 is a block diagram illustrating an example of a schematic configuration of a smartphone 900 to which the technology according to the present disclosure is applicable. The smartphone 900 includes a processor 901, a memory 902, a storage 903, an external coupling interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip). The processor 901 controls functions of an application layer and other layers of the smartphone 900. The memory 902 includes a RAM (Random Access Memory) and a ROM (Read Only Memory), and stores a program to be executed by the processor 901 and data. The storage 903 can include a storage medium such as a semiconductor memory or a hard disk. The external coupling interface 904 is an interface for coupling an externally attached device such as a memory card or a USB (Universal Serial Bus) device to the smartphone 900.

The camera 906 includes, for example, an imaging device such as a CCD (Charge Coupled Device) or a CMOS (Complementary Metal Oxide Semiconductor), and generates a captured image. The sensor 907 can include a sensor group including, for example, a positioning sensor, a gyro sensor, a geomagnetic sensor, an acceleration sensor, and the like. The microphone 908 converts a sound that is inputted into the smartphone 900 into a sound signal. The input device 909 includes, for example, a touch sensor that detects a touch onto a screen of the display device 910, a keypad, a keyboard, a button, a switch, and the like, and receives operation or an information input from a user. The display device 910 includes a screen such as a liquid crystal display (LCD) or an organic light-emitting diode (OLED) display, and displays an output image of the smartphone 900. The speaker 911 converts the sound signal outputted from the smartphone 900 into a sound.

The wireless communication interface 913 supports one or more of wireless LAN standards such as (but not limited to) IEEE802.11a, 11b, 11g, 11n, 11ac, and 11ad, and performs wireless communication. The wireless communication interface 913 can communicate with another apparatus via a wireless LAN access point in an infrastructure mode. Further, the wireless communication interface 913 can directly communicate with another apparatus in an ad-hoc mode or a direct communication mode such as Wi-Fi Direct (registered trademark). Note that, in the Wi-Fi Direct, unlike the ad-hoc mode, one of the two terminals operates as an access point. However, communication takes place directly between these terminals. Typically, the wireless communication interface 913 can include a baseband processor, an RF (Radio Frequency) circuit, a power amplifier, and the like. The wireless communication interface 913 may be a one-chip module in which a memory that stores a communication control program, a processor that executes the program, and a related circuit are integrated. The wireless communication interface 913 may support another type of wireless communication scheme such as a short-range wireless communication scheme, a near field wireless communication scheme, or a cellular communication scheme in addition to the wireless LAN scheme. The antenna switch 914 switches a connection destination of the antenna 915 between a plurality of circuits (for example, circuits for different wireless communication schemes) included in the wireless communication interface 913. The antenna 915 includes one or more antenna devices (for example, a plurality of antenna devices included in a MIMO antenna), and is used for transmission and reception of the wireless signal by the wireless communication interface 913.

Note that the smartphone 900 is not limited to the example in FIG. 20, and may include a plurality of antennas (for example, an antenna for wireless LAN and an antenna for a near-field wireless communication scheme). In that case, the antenna switch 914 may be omitted from the configuration of the smartphone 900.

The bus 917 couples the processor 901, the memory 902, the storage 903, the external coupling interface 904, the camera 906, the sensor 907, the microphone 908, the input device 909, the display device 910, the speaker 911, the wireless communication interface 913, and the auxiliary controller 919 to each other. The battery 918 supplies electric power to each block of the smartphone 900 illustrated in FIG. 20 via a power supply line partially illustrated in dashed lines in the drawing. The auxiliary controller 919, for example, causes a bare minimal function of the smartphone 900 to operate in a sleep mode.

In the smartphone 900 illustrated in FIG. 20, the wireless communication module 101 and the wireless communication module 201 described using FIG. 14 may be implemented in the wireless communication interface 913. Further, at least a part of these functions may be implemented in the processor 901 or the auxiliary controller 919.

Note that the smartphone 900 may operate as a wireless access point (software AP) by causing the processor 901 to execute the access point function at an application level. Further, the wireless communication interface 913 may have a wireless access point function.

3.2. Second Application Example

Figure 21:
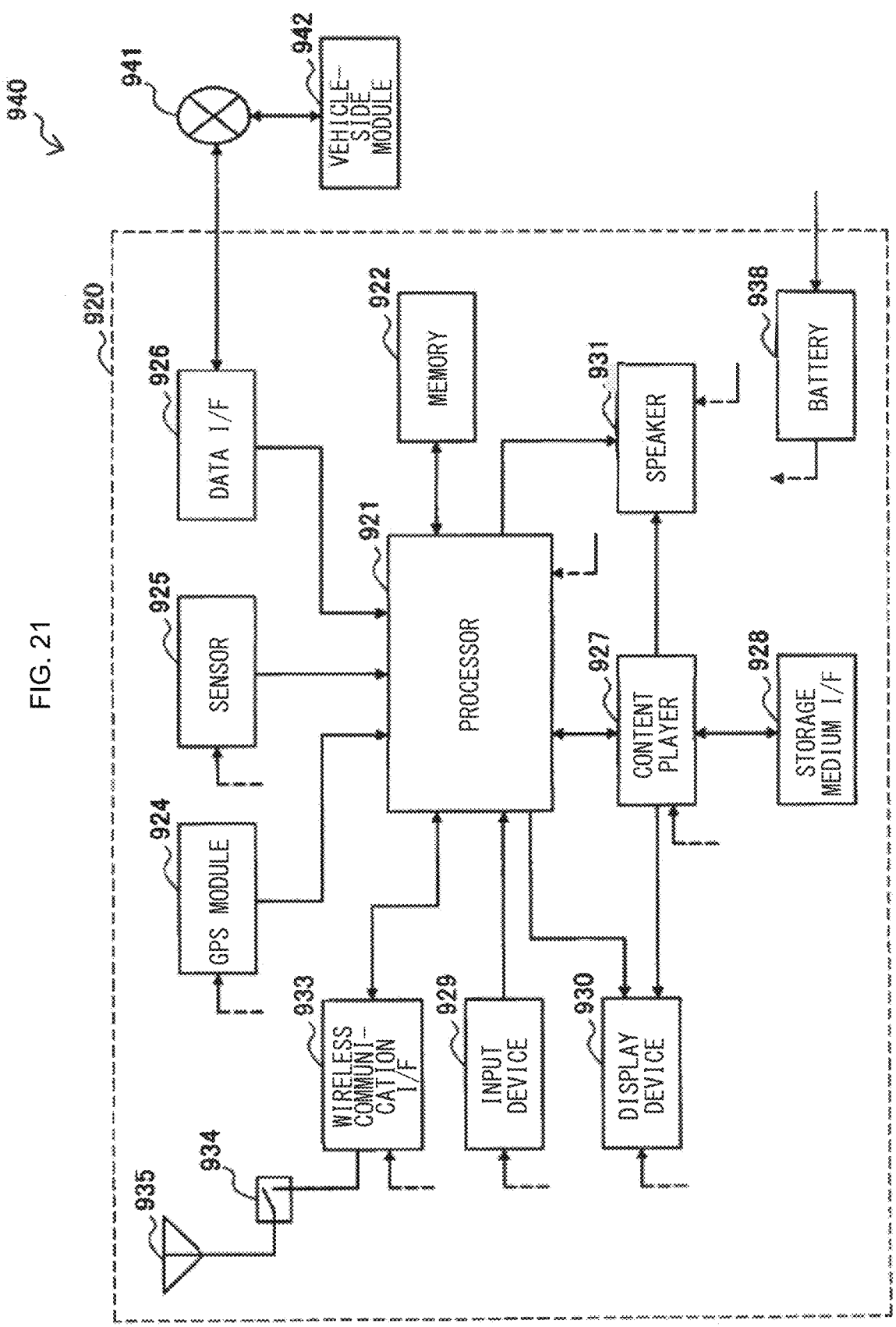
FIG. 21 is a block diagram illustrating an example of a schematic configuration of a car navigation apparatus.

FIG. 21 is a block diagram illustrating an example of a schematic configuration of a car navigation apparatus 920 to which the technology according to the present disclosure is applicable. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC. The processor 921 controls a navigation function and other functions of the car navigation apparatus 920. The memory 922 includes a RAM and a ROM, and stores a program that is executed by the processor 921 and data.

The GPS module 924 uses a GPS signal received from a GPS satellite to measure the position (for example, latitude, longitude, and altitude) of the car navigation apparatus 920. The sensor 925 can include, for example, a sensor group including a gyro sensor, a geomagnetic sensor, a barometric sensor, and the like. The data interface 926 is, for example, connected to an on-vehicle network 941 via an unillustrated terminal, and acquires data, such as a vehicle speed data, generated on the vehicle side.

The content player 927 reproduces a content stored in a storage medium (for example, a CD or a DVD) inserted into the storage medium interface 928. The input device 929 includes, for example, a touch sensor that detects a touch onto a screen of the display device 930, a button, a switch, and the like, and receives operation or an information input from a user. The display device 930 includes a screen such as an LCD or an OLED display, and displays an image of the navigation function or the reproduced content. The speaker 931 outputs a sound of the navigation function or the reproduced content.

The wireless communication interface 933 supports one or more of wireless LAN standards such as (but not limited to) IEEE802.11a, 11b, 11g, 11n, 11ac, and 11ad, and performs wireless communication. The wireless communication interface 933 can communicate with another apparatus via a wireless LAN access point in an infrastructure mode. Further, the wireless communication interface 933 can directly communicate with another apparatus in an ad-hoc mode or a direct communication mode such as Wi-Fi Direct. Typically, the wireless communication interface 933 can include a baseband processor, an RF circuit, a power amplifier, and the like. The wireless communication interface 933 may be a one-chip module in which a memory that stores a communication control program, a processor that executes the program, and a related circuit are integrated. The wireless communication interface 933 may support another type of wireless communication scheme such as a short-range wireless communication scheme, a near field wireless communication scheme, or a cellular communication scheme in addition to the wireless LAN scheme. The antenna switch 934 switches a coupling destination of the antenna 935 between a plurality of circuits included in the wireless communication interface 933. The antenna 935 includes one or more antenna devices, and is used for transmission and reception of the wireless signal by the wireless communication interface 933.

Note that it is not limited to the example in FIG. 21, and the car navigation apparatus 920 may include a plurality of antennas. In that case, the antenna switch 934 may be omitted from the configuration of the car navigation apparatus 920.

The battery 938 supplies electric power to each block of the car navigation apparatus 920 illustrated in FIG. 21 via a power supply line partially illustrated in dashed lines in the drawing. Further, the battery 938 accumulates the electric power supplied from the vehicle side.

In the car navigation apparatus 920 illustrated in FIG. 21, the wireless communication module 101 and the wireless communication module 201 described using FIG. 14 may be implemented in the wireless communication interface 933. Further, at least a part of these functions may be implemented in the processor 921.

Further, the wireless communication interface 933 may operate as the AP 100 described above, and provide wireless connection to a terminal of a vehicle-riding user. In this case, for example, the wireless communication interface 933 is allowed to set the primary channel and the secondary channel by the method described with reference to FIG. 4 or the like.

Further, the technology according to the present disclosure may be implemented as an on-vehicle system (or a vehicle) 940 including one or more blocks of the car navigation apparatus 920 described above, an on-vehicle network 941, and a vehicle-side module 942. The vehicle-side module 942 generates vehicle-side data such as a vehicle speed, an engine speed, or malfunction information, and outputs the generated data to the on-vehicle network 941.

3.3. Third Application Example

FIG. 22 is a block diagram illustrating an example of a schematic configuration of a wireless access point 950 to which the technology according to the present disclosure is applicable. The wireless access point 950 includes a controller 951, a memory 952, an input device 954, a display device 955, a network interface 957, a wireless communication interface 963, an antenna switch 964, and an antenna 965.

The controller 951 may be a CPU or a DSP (Digital Signal Processor), for example. The controller 951 causes various functions of an IP (Internet Protocol) layer and a higher layer of the wireless access point 950 (for example, access restriction, routing, encryption, firewall, log management, and the like) to operate. The memory 952 includes a RAM and a ROM, and stores a program to be executed by the controller 951 and various types of control data (for example, a terminal list, a routing table, an encryption key, a security setting, a log, and the like).

The input device 954 includes, for example, a button, a switch, or the like, and receives operation from a user. The display device 955 includes an LED lamp and the like, and displays an operation status of the wireless access point 950. The network interface 957 is a wired communication interface for allowing the wireless access point 950 to be connected to a wired communication network 958. The network interface 957 may include a plurality of connection terminals. The wired communication network 958 may be a LAN such as Ethernet (registered trademark) or may be a WAN (Wide Area Network).

The wireless communication interface 963 supports one or more of wireless LAN standards such as (but not limited to) IEEE802.11a, 11b, 11g, 11n, 11ac, and 11ad, and provides wireless connection to a nearby terminal as an access point. Typically, the wireless communication interface 963 can include a baseband processor, an RF circuit, a power amplifier, and the like. The wireless communication interface 963 may be a one-chip module in which a memory that stores a communication control program, a processor that executes the program, and a related circuit are integrated. The antenna switch 964 switches a connection destination of the antenna 965 between a plurality of circuits included in the wireless communication interface 963. The antenna 965 includes one or more antenna devices, and is used for transmission and reception of the wireless signal by the wireless communication interface 963.

In the wireless access point 950 illustrated in FIG. 22, the wireless communication module 101 described using FIG. 14 may be implemented in the wireless communication interface 963. Further, at least a part of these functions may be implemented in the controller 951.

4. CONCLUSION

As described above, the AP 100 according to the present disclosure receives the channel notification signal including the information regarding the channel used in the OBSS, and determines the frequency band of the channel used in the BSS 10 on the basis of the information regarding the channel used in the OBSS. More specifically, the AP 100 sets (or changes) the frequency band of the primary channel and the secondary channel used in the BSS 10 on the basis of the information regarding the primary channel and the secondary channel of the OBSS. Accordingly, the AP 100 is able to suppress occurrence of interference between the signal of the BSS 10 and the signal of the OBSS.

Preferred embodiments of the present disclosure have been described above in detail with reference to the accompanying drawings, but the technical scope of the present disclosure is not limited to such examples. A person having ordinary knowledge in the technical field of the present disclosure may apparently find various alterations and modifications within the scope of the technical idea disclosed in the claims, and it should be understood that they naturally belong to the technical scope of the present disclosure.

Further, the effects described herein are merely illustrative and exemplary, and not limitative. That is, the technology according to the present disclosure may exert any other effect that is apparent to those skilled in the art from the description herein, in addition to the above-described effects or in place of the above-described effects.

Note that the technical scope of the present disclosure also includes the following configurations.

(1)

A wireless communication apparatus serving as an access point of a wireless LAN, the wireless communication apparatus including:
  a wireless communication unit that receives a signal including information regarding a channel used in an OBSS (Overlap Basic Service Set); and
  a controller that determines a frequency band of a channel used in a BSS (Basic Service Set) on the basis of the information regarding the channel used in the OBSS.

(2)

The wireless communication apparatus according to (1) described above, in which the controller dynamically changes the frequency band of the channel used in the BSS on the basis of the information regarding the channel used in the OBSS.

(3)

The wireless communication apparatus according to (2) described above, in which the controller determines a frequency band of a primary channel used in the BSS on the basis of the information regarding the channel used in the OBSS.

(4)

The wireless communication apparatus according to (2) or (3) described above, in which the controller determines a frequency band of one or more secondary channels used in the BSS on the basis of the information regarding the channel used in the OBSS.

(5)

The wireless communication apparatus according to (4) described above, in which the controller determines frequency bands of a plurality of the secondary channels having bandwidths different from each other on the basis of the information regarding the channel used in the OBSS.

(6)

The wireless communication apparatus according to (5) described above, in which the controller determines priorities for use of the plurality of secondary channels on the basis of the information regarding the channel used in the OBSS.

(7)

The wireless communication apparatus according to any one of (1) to (6) described above, in which the information regarding the channel used in the OBSS includes information regarding a primary channel used in the OBSS and information regarding a secondary channel used in the OBSS.

(8)

The wireless communication apparatus according to (7) described above, in which the controller determines a frequency band that is different from that of the primary channel used in the OBSS, as a frequency band of a primary channel used in the BSS.

(9)

The wireless communication apparatus according to (8) described above, in which the controller determines a frequency band farthest from the primary channel used in the OBSS of a plurality of channels that are candidates for use, as the frequency band of the primary channel used in the BSS.

(10)

The wireless communication apparatus according to any one of (1) to (9) described above, further including a signal generating unit that generates a signal including information regarding the channel used in the BSS, in which
  the wireless communication unit transmits the signal including the information regarding the channel used in the BSS to an external apparatus.

(11)

A wireless communication method to be performed by an access point of a wireless LAN, the wireless communication method including:
  receiving a signal including information regarding a channel used in an OBSS; and
  determining a frequency band of a channel used in a BSS on the basis of the information regarding the channel used in the OBSS.

(12)

A wireless communication apparatus serving as a station of a wireless LAN, the wireless communication apparatus including:
  a signal generating unit that generates a signal including information regarding a channel used in an OBSS, the information being used to determine a frequency band of a channel used in a BSS; and
  a wireless communication unit that transmits the signal including the information regarding the channel used in the OBSS to an external apparatus belonging to the BSS.

(13)

The wireless communication apparatus according to (12) described above, in which the information regarding the channel used in the OBSS includes information regarding a primary channel used in the OBSS and information regarding a secondary channel used in the OBSS.

(14)

The wireless communication apparatus according to (13) described above, in which the information regarding the secondary channel includes information regarding frequency bands of a plurality of the secondary channels having bandwidths different from each other.

(15)

The wireless communication apparatus according to described above (14), in which the information regarding the secondary channel includes information regarding priorities for use of the plurality of secondary channels.

(16)

The wireless communication apparatus according to any one of (12) to (15), in which
  the wireless communication unit receives another signal including the information regarding the channel used in the OBSS from an external apparatus belonging to the OBSS, and
  the signal generating unit generates the signal including the information regarding the channel used in the OBSS in a case where the wireless communication unit receives the other signal including the information regarding the channel used in the OBSS.

(17)

The wireless communication apparatus according to any one of (12) to (16) described above, further including a controller that sets, in a case where the wireless communication unit receives a signal including information regarding the channel used in the BSS from an access point belonging to the BSS, the frequency band of the channel used in the BSS on the basis of the information regarding the channel used in the BSS.

(18)

The wireless communication apparatus according to (17) described above, in which
in the case where the wireless communication unit receives the signal including the information regarding the channel used in the BSS from the access point belonging to the BSS,
the signal generating unit generates another signal including the information regarding the channel used in the BSS, and
the wireless communication unit transmits the other signal including the information regarding the channel used in the BSS to an external apparatus belonging to the OBSS.

(19)

The wireless communication apparatus according to (18) described above, in which
the signal generating unit generates, in a case where at least a part of the OBSS is present in a communication range of an own apparatus, the signal including the information regarding the channel used in the BSS, and
the wireless communication unit transmits the signal including the information regarding the channel used in the BSS to the external apparatus belonging to the OBSS.

(20)

A wireless communication method to be performed by a station of a wireless LAN, the wireless communication method including:
generating a signal including information regarding a channel used in an OBSS, the information being used to determine a frequency band of a channel used in a BSS; and
transmitting the signal including the information regarding the channel used in the OBSS to an external apparatus belonging to the BSS.

DESCRIPTION OF REFERENCE SIGNS

100 AP
200 STA
101, 201 wireless communication module
102, 202 device controller
103, 203 information input module
104, 204 information output module
105 Internet connection module
110, 210 wireless communication unit
111, 211 antenna controller
112, 212 reception processing unit
113, 213 transmission processing unit
120, 220 data processing unit
121, 221 signal analyzer
122, 222 reception buffer
123, 223 interface unit
124, 224 transmission buffer
125, 225 signal generating unit
130, 230 controller
131, 231 operation control unit
132, 232 signal control unit

The invention claimed is:

1. A wireless communication control apparatus that includes control circuitry for controlling a wireless transceiver included in a wireless communication apparatus and that serves as an access point (AP) of a wireless local area network (LAN), the wireless communication apparatus configured with a Basic Service Set (BSS) and an Overlap Basic Service Set (OBSS) and belonging to a station (STA), the wireless communication apparatus comprising:
wherein the control circuitry is configured to:
receive, from the STA, a first signal including information regarding a frequency band in the OBSS that corresponds to a channel of another device,
wherein the channel of another device is one of a primary or a secondary channel of the another device,
wherein the first signal further comprises an announce type having a value selected from a predetermined set of values;
determine whether or not the selected value indicates that the first signal is from the STA to which the AP belongs;
upon determining that the selected value indicates that the first signal is from the STA to which the AP belongs, determine a frequency band of the BSS on a basis of the information regarding the frequency band in the OBSS that corresponds to the channel of the another device; and
control the wireless transceiver to use the determined frequency band of the BSS as a channel to communicate on the wireless LAN,
wherein the determined frequency band of the BSS does not overlap with any frequency band in the OBSS that is used by the another device.

2. The wireless communication control apparatus according to claim 1, wherein the control circuitry dynamically changes the determined frequency band used in the BSS as the channel to communicate on the wireless LAN on the basis of the information regarding the frequency in the OBSS that corresponds to the channel of the another device.

3. The wireless communication control apparatus according to claim 2, wherein the determined frequency band of the BSS comprises a frequency band of the BSS corresponding to a primary channel of the wireless communication apparatus.

4. The wireless communication control apparatus according to claim 2, wherein the determined frequency band of the BSS comprises one or more frequency bands of the BSS corresponding to one or more secondary channels of the wireless communication apparatus.

5. The wireless communication control apparatus according to claim 4, wherein the one or more secondary channels comprises a plurality of the secondary channels having bandwidths different from each other.

6. The wireless communication control apparatus according to claim 5, wherein the control circuitry determines priorities for the plurality of secondary channels on the basis of the information regarding the frequency band in the OBSS that corresponds to the channel of the another device.

7. The wireless communication control apparatus according to claim 1, wherein the information regarding the frequency band in the OBSS that corresponds to the channel of the another device includes information regarding a frequency band of a primary channel of the another device and information regarding a frequency band of a secondary channel of the another device.

8. The wireless communication control apparatus according to claim 7,
wherein the determined frequency band of the BSS comprises a frequency band that is different from that of the primary channel used in the OBSS by the another device, as a frequency band of a primary channel of the BSS used by the wireless communication apparatus.

9. The wireless communication control apparatus according to claim 8, wherein the frequency band that is different from that of the primary channel used in the OBSS by the another device comprises a frequency band in the BSS farthest in the frequency domain from the primary channel used in the OBSS by the another device.

10. The wireless communication control apparatus according to claim 1,
wherein the control circuitry generates and transmits to the STA a second signal including information regarding the determined frequency band of the BSS used by the wireless communication apparatus, and
wherein the second signal further comprises an announce type having a value selected from the predetermined set of values, the selected value indicating that the second signal is to the STA to which the AP belongs.

11. A wireless communication method performed by control circuitry of a wireless communication control apparatus serving as an access point (AP) of a wireless local area network (LAN), the wireless communication apparatus configured with a Basic Service Set (BSS) and an Overlap Basic Service Set (OBSS) and belonging to a station (STA), the wireless communication method comprising:
receiving, from the STA, a first signal including information regarding a frequency band in the OBSS that corresponds to a channel of another device,
wherein the channel of another device is one of a primary or a secondary channel of the another device,
wherein the first signal further comprises an announce type having a value selected from a predetermined set of values;
determining whether or not the selected value indicates that the first signal is from the STA to which the AP belongs;
upon determining that the selected value indicates that the first signal is from the STA to which the AP belongs, determining a frequency band of the BSS on a basis of the information regarding the frequency band in the OBSS that corresponds to the channel of the another device; and
using the determined frequency band of the BSS as a channel to communicate on the wireless LAN,
wherein the determined frequency band of the BSS does not overlap with any frequency band in the OBSS that is used by the another device.

12. A wireless communication control apparatus that includes control circuitry for controlling a wireless transceiver included in a wireless communication apparatus and that serves as a station (STA) of a wireless local area network (LAN), the wireless communication apparatus comprising:
wherein the control circuitry is configured to:
transmit, to an access point (AP) belonging to the STA, a first signal including information regarding a frequency band in the OBSS that corresponds to a channel of another device,
wherein the channel of another device is one of a primary or a secondary channel of the another device,
wherein the first signal further comprises an announce type having a value selected from a predetermined set of values,
wherein the AP:
determines whether or not the selected value indicates that the first signal is from the STA to which the AP belongs,
upon determining that the selected value indicates that the first signal is from the STA to which the AP belongs, the AP determines a frequency band of the BSS on a basis of the information regarding the frequency band in the OBSS that corresponds to the channel of the another device, and
uses the determined frequency band of the BSS as a channel to communicate on the wireless LAN, and
wherein the determined frequency band of the BSS does not overlap with any frequency band in the OBSS that is used by the another device; and
receive, from the AP, a second signal including information regarding the determined frequency band of the BSS used by the wireless communication apparatus,
wherein the second signal further comprises an announce type having a value selected from the predetermined set of values, the selected value indicating that the second signal is to the STA to which the AP belongs.

13. The wireless communication control apparatus according to claim 12, wherein the information regarding the frequency band in the OBSS that corresponds to the channel of the another device includes information regarding a frequency band of a primary channel of the another device and information regarding a frequency band of a secondary channel of the another device.

14. The wireless communication control apparatus according to claim 13, wherein the information regarding the frequency band of the secondary channel of the another device includes information regarding frequency bands of a plurality of secondary channels of the another device each having bandwidths different from each other.

15. The wireless communication control apparatus according to claim 14, wherein the information regarding the plurality of secondary channels of the another device includes information regarding usage priorities of the plurality of secondary channels of the another device.

16. The wireless communication control apparatus according to claim 12, wherein the control circuitry generates the first signal upon receiving, from the another device, a third signal including the information regarding the frequency band in the OBSS that corresponds to the channel of another device.

17. The wireless communication control apparatus according to claim 12, wherein the control circuitry updates previously set BSS information based on the second signal received from the AP.

18. The wireless communication control apparatus according to claim 17, wherein the control circuitry relays the information regarding the determined frequency band of the BSS used by the wireless communication apparatus to an external device.

19. A wireless communication method performed by control circuitry of a wireless communication control apparatus serving as a station (STA) of a wireless local area network (LAN), the wireless communication method comprising:
transmitting, to an access point (AP) belonging to the STA, a first signal including information regarding a frequency band in the OBSS that corresponds to a channel of another device,
wherein the channel of another device is one of a primary or a secondary channel of the another device,
wherein the first signal further comprises an announce type having a value selected from a predetermined set of values,
wherein the AP:
determines whether or not the selected value indicates that the first signal is from the STA to which the AP belongs,
upon determining that the selected value indicates that the first signal is from the STA to which the AP belongs, the AP determines a frequency band of the BSS on a basis of the information regarding the frequency band in the OBSS that corresponds to the channel of the another device, and uses the determined frequency band of the BSS as a channel to communicate on the wireless LAN, wherein the determined frequency band of the BSS does not overlap with any frequency band in the OBSS that is used by the another device, and receiving, from the AP, a second signal including information regarding the determined frequency band of the BSS used by the wireless communication apparatus, wherein the second signal further comprises an announce type having a value selected from the predetermined set of values, the selected value indicating that the second signal is to the STA to which the AP belongs.

* * * * *